United States Patent
Inagaki et al.

(10) Patent No.: US 6,337,715 B1
(45) Date of Patent: Jan. 8, 2002

(54) BROADCASTING RECEPTION APPARATUS AND DATA BROADCASTING METHOD

(75) Inventors: Satoru Inagaki, Suita; Atsushi Ishizu, Ibaraki; Tetsuji Maeda, Nara; Shuuhei Taniguchi, Moriguchi; Yutaka Nio, Osaka; Etsuyoshi Sakaguchi, Ibaraki; Kenjirou Tsuda, Hirakata, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/109,182

(22) Filed: Jul. 2, 1998

(30) Foreign Application Priority Data

| Jul. 4, 1997 | (JP) | ............................................. 9-179762 |
| Jul. 10, 1997 | (JP) | ............................................. 9-185549 |
| Jul. 11, 1997 | (JP) | ............................................. 9-187035 |
| Jul. 14, 1997 | (JP) | ............................................. 9-188812 |

(51) Int. Cl.[7] .......................... H04N 7/10; H04N 11/02; H04N 5/445; H04N 5/444
(52) U.S. Cl. .................. 348/553; 348/10; 348/563; 348/906; 348/387; 348/423; 348/553
(58) Field of Search ........................... 348/10, 565, 12, 348/13, 6, 906, 387, 423, 553

(56) References Cited

U.S. PATENT DOCUMENTS

| 5,229,850 | A | * | 7/1993 | Toyosima .................... 358/108 |
| 5,231,494 | A | * | 7/1993 | Wachob ...................... 358/146 |
| 5,477,263 | A | | 12/1995 | O'Callaghan et al. ......... 348/7 |
| 5,502,497 | A | | 3/1996 | Yamaashi et al. ........... 348/473 |
| 5,790,753 | A | * | 8/1998 | Krishnamoorthy et al. ...... 395/200.33 |
| 5,862,140 | A | * | 1/1999 | Shen et al. ................. 370/468 |
| 5,966,385 | A | * | 10/1999 | Fujii et al. .................. 370/465 |
| 5,999,528 | A | * | 12/1999 | Chow et al. ................. 370/365 |
| 6,028,539 | A | * | 2/2000 | Matsui ........................ 341/55 |
| 6,037,995 | A | * | 3/2000 | Ichifuji et al. ............... 348/563 |

FOREIGN PATENT DOCUMENTS

| JP | 5-64167 | 3/1993 |
| JP | 7-15392 | 1/1995 |

\* cited by examiner

*Primary Examiner*—Reinhard J. Eisenzopf
*Assistant Examiner*—Paulos Natnael
(74) *Attorney, Agent, or Firm*—Parkhurst & Wendel, L.L.P.

(57) ABSTRACT

A broadcasting reception apparatus includes a display unit for presenting a display showing a plurality of channels, with which the user can recognize whether decoding software programs for decoding program signals being currently broadcast via each channel are held in a library buffer, or not, thereby making possible pleasant zapping.

21 Claims, 23 Drawing Sheets

Fig.3
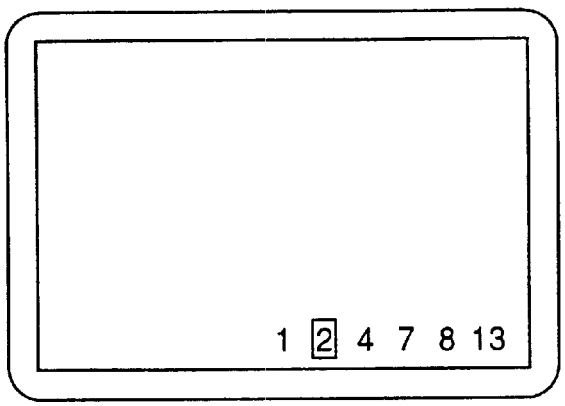
Fig.4
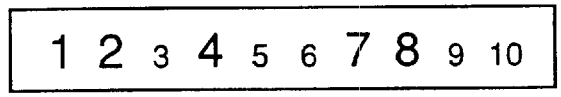
Fig.5
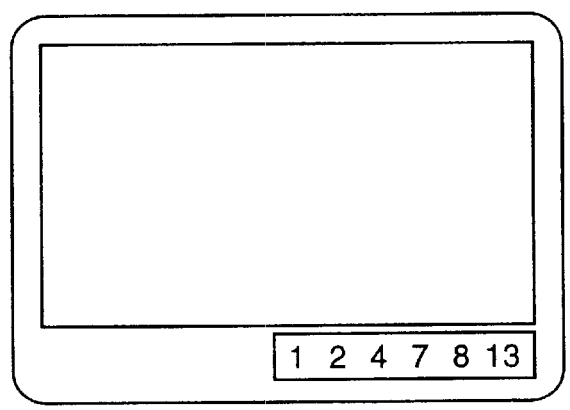
Fig.6
A [a] [b] [c]
B [d] [e] [f]
C [a] [b] [e]
D [a] [d] [g]
E [h] [i] [j]

| channel | the number of watching times |
|---|---|
| 1 | 2 |
| 2 | 3 |
| 3 | 5 |
| 4 | 0 |
| 5 | 1 |

| 1 | 2 | 3 | 4 |
|---|---|---|---|
| 5 | 6 | 7 | 8 |
| 9 | 10 | 11 | 12 |
| 13 | 14 | 15 | 16 |

Fig.27

| 1 | 2 |
|---|---|
| 5 | 6 |

Fig.28

| 3 | 4 |
|---|---|
| 7 | 8 |

Fig.29
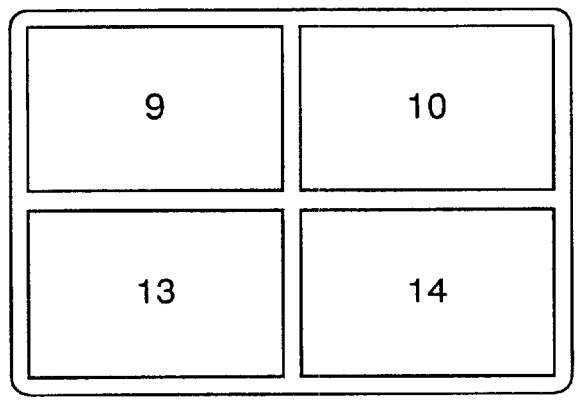
Fig.30
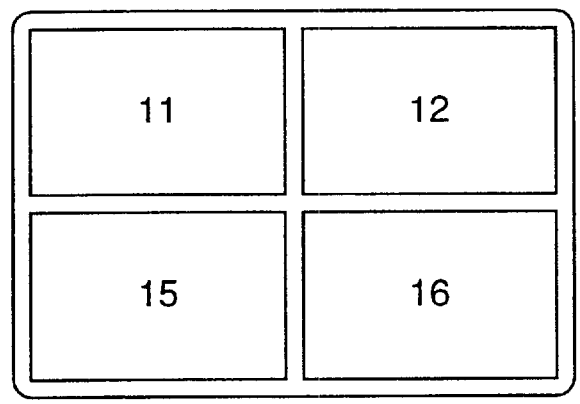
Fig.31
| 1 | 2 | 3 | 4 | 17 | 18 | 19 | 20 |
|---|---|---|---|----|----|----|----|
| 5 | 6 | 7 | 8 | 21 | 22 | 23 | 24 |
| 9 | 10 | 11 | 12 | 25 | 26 | 27 | 28 |
| 13 | 14 | 15 | 16 | 29 | 30 | 31 | 32 |
| 33 | 34 | 35 | 36 | 49 | 50 | 51 | 52 |
| 37 | 38 | 39 | 40 | 53 | 54 | 55 | 56 |
| 41 | 42 | 43 | 44 | 57 | 58 | 59 | 60 |
| 45 | 46 | 47 | 48 | 61 | 62 | 63 | 64 |

|  | ch1 | ch2 | ch3 | ch4 | ch5 |
|---|---|---|---|---|---|
| time T1 t → t+α → T2 | A | B | B | A | A |
| T3 | D | D | C | B | D |
| T4 | A | A | D |  | A |
| T5 | C |  | B | B | B |
|  | B | A | A | D |  |

| A | B | B | A | A | A | B | B | A | A | ... |
|---|---|---|---|---|---|---|---|---|---|---|

| the name of a library | the necessary number of the library |
|---|---|
| A | 5 |
| B | 4 |
| C | 3 |
| D | 2 |

Fig.39

| channel | ch1 | ch2 | ch3 | ch4 | ch5 | ch6 | ch7 | ch8 | ch9 | ch10 | ch11 | ch12 | ch13 | ch14 |
|---|---|---|---|---|---|---|---|---|---|---|---|---|---|---|
| necessary library | A | B | C | D | A | B | A | C | D | A | A | B | B | C |
| watching rate | 1 | 3 | 3 | 8 | 2 | 2 | 1 | 2 | 10 | 1 | 2 | 5 | 2 | 6 |

Fig.40

| the name of a library | the necessary number of the library | watching rate | the number of the libraries to be transmitted (ratio) |
|---|---|---|---|
| A | 5 | 7 | 35 |
| B | 4 | 12 | 48 |
| C | 3 | 11 | 33 |
| D | 2 | 18 | 36 | data to be transmitted

A picture to be displayed data to be transmitted

A picture to be displayed

Fig.44 (a) Prior Art
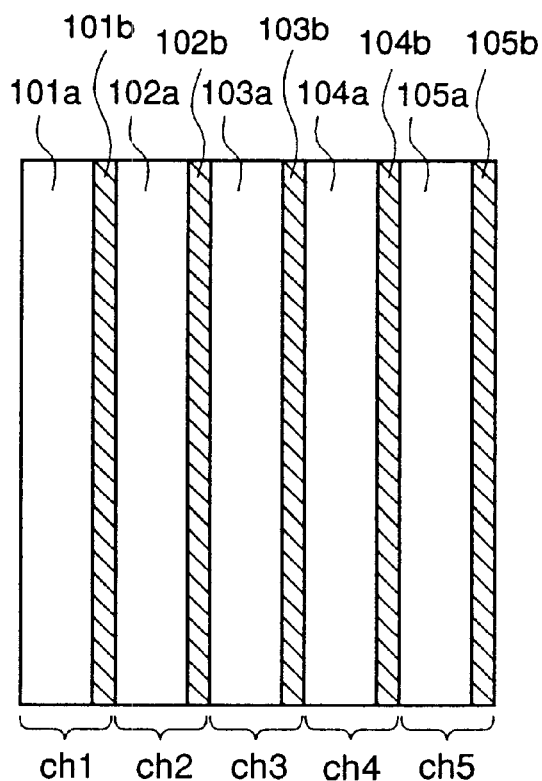
Fig.44 (b) Prior Art
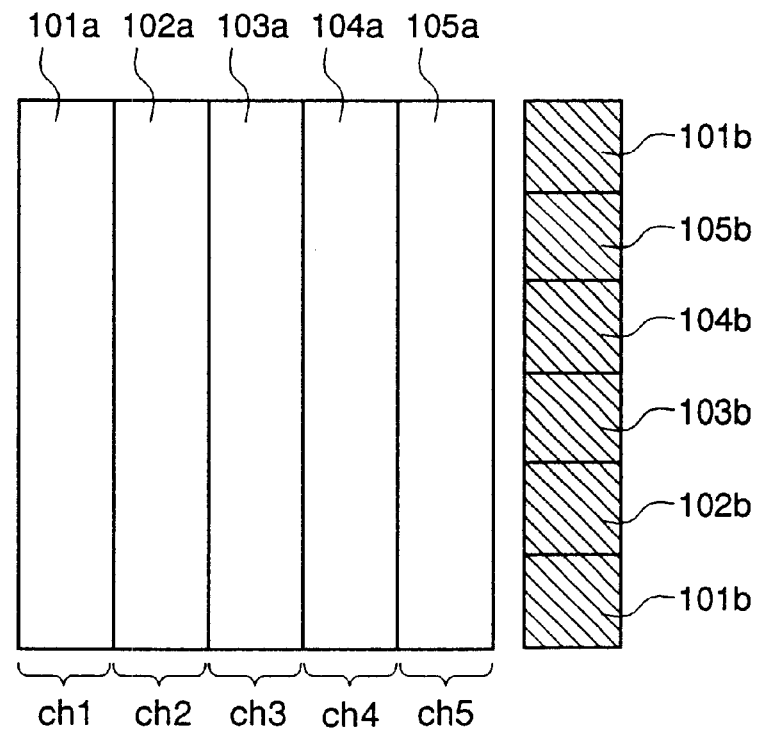

BROADCASTING RECEPTION APPARATUS AND DATA BROADCASTING METHOD

FIELD OF THE INVENTION

The present invention relates to a broadcasting reception apparatus receiving a broadcast signal transmitted with a data broadcasting method of broadcasting program signals of two or more kinds of broadcasting formats via plurality of channels. Further, it relates to a data broadcasting method of broadcasting program signals of two or more kinds of broadcasting formats via a plurality of channels, and broadcasting a decoding software program for decoding the program signals using a channel different from the plurality of channels, and, more particularly, to a data broadcasting method with which a waiting time for downloading a decoding software program for decoding program signals can be reduced on the receiving side.

BACKGROUND OF THE INVENTION

FIG. 41 is a diagram showing a structure of a broadcasting system using a broadcasting satellite. In the figure, reference numeral 201 denotes sub-broadcasters, such as television broadcasting stations, broadcasting one or more channels of broadcast signals. 202 is a broadcaster including a broadcasting satellite which receives broadcast signals from the plurality of sub-broadcasters 201, processes the broadcast signals, and transmits the result to a viewer's terminal, i.e., a broadcasting reception apparatus.

In a prior art broadcasting system, all sub-broadcasters produce and transmit programs of a common broadcasting format, i.e., a video transmission format, a video coding format, and so on, such as MPEG, over all channels, while the viewer receives and reproduces broadcast signals by exclusive hardware corresponding to the common broadcasting format. That is, in the conventional broadcasting system, as shown in FIG. 42, the exclusive hardware receives data of the MPEG format transmitted by the sub-broadcasters 201 via the broadcaster 202, and displays the data on a full screen of a TV set or the like.

On the other hand, an improvement in performance of computers makes possible video signal processing, which could have been handled only with exclusive hardware, with software using general-purpose hardware. That is, signal processing with such software makes it possible to decode broadcast data of plural different broadcasting formats, if a decoding software program (library) for decoding each broadcast data is loaded in the general-purpose hardware. Thus, if broadcast data of plural different broadcasting formats can be decoded on the receiving side, broadcasting in which various broadcasting formats coexist, such as data broadcasting different from the conventional video/audio broadcasting, i.e., CG broadcasting and animation broadcasting, becomes possible. In such a broadcasting system, it is possible to provide such data as text and CG related to the conventional video, so a producer can create elaborate contents, and a viewer can receive various kinds of contents from a conventional service only for seeing to an interactive service. For example, as shown in FIG. 43, it is possible that plural data of different broadcasting formats coexisting in a channel are transmitted on the transmitting side, and plural contents of different broadcasting formats are displayed in a screen on the receiving side.

Further, if a decoding software program for decoding broadcast data is provided via broadcasting, even when a broadcasting reception apparatus does not have a decoding software program for decoding a certain broadcast data, this decoding software program can be downloaded via broadcasting so that the broadcast data can be decoded. Thus, on the receiving side it is not necessary to hold many kinds of decoding software programs (libraries) at any time, that is, the receiver does not need a large amount of storage means, and the receiver can adapt to a case where the program provider adopts a new broadcasting format.

To provide a decoding software program for decoding broadcast data via broadcasting, there may be, as shown in FIG. 44(a), a way in which a decoding program for decoding broadcast data is multiplexed into the broadcast data for each channel, or as shown in FIG. 44(b), a way in which a channel for broadcasting exclusively a decoding program for decoding broadcast data is set up apart from channels for the broadcast data, a decoding software program for decoding the broadcast data transmitted via the channel for the broadcast data is repeatedly broadcast.

A broadcasting reception apparatus used in such a system providing a decoding software program for decoding broadcast data, includes a program storage unit for holding the decoding software program (library), and decodes the broadcast data using the decoding software program stored in the program storage unit. When the decoding software program for decoding broadcast data received is not held in the program storage unit, the decoding software program is downloaded to the broadcasting reception apparatus as described above.

The viewer usually performs an operation called zapping, by which the viewer checks the contents of programs broadcast simultaneously, by switching channels in a short time. In zapping, when all sub-broadcasters perform broadcasting of a single format about all channels like the conventional broadcasting, program pictures can be instantly switched by the viewer's switching broadcasting channels. However, in a case of a broadcasting system using the foregoing signal processing by software, when no software program for decoding its broadcast data is held in advance for a switched channel in zapping, a delay downloading the program makes it difficult to switch channels in a short time, which leads to unpleasant zapping.

For example, when zapping from channel 1 to channel 2, if a decoding software program (library) for decoding a program signal on the channel 1 is a library A, and libraries for decoding a program signal on the channel 2 is a library B and a library D, it is necessary to download the libraries B and D, so it takes time to wait until the program on the channel 2 is displayed.

If the viewer can check for what channel a decoding software program (library) is available in a library buffer of a broadcasting reception apparatus, or can check what channel, for which a decoding library is not held in the library buffer, can be nevertheless listened or watched in a short waiting time because it takes a short time to download the library.

To select receiving channels in a broadcasting reception apparatus, based on EPG (Electric Program Guide) convoluted in program broadcasting, an EPG picture is displayed in which a plurality of cells are arranged in a matrix, each cell being indicated by a channel number, as shown in FIG. 19, and a channel to be received is chosen by moving a cursor shown on the EPG picture, indicating a cell ch8 in FIG. 19, up to down, side to side, and diagonally with a remote control having key buttons shown in FIG. 20. This channel selection system is convenient for a user because simple button operation lets the user shift the cursor to select channels, and the EPG picture can display only channels that the user desires by the user's setting, and so on.

In selecting channels using EPG, when all sub-broadcasters perform broadcasting of a single format on all channels like the conventional broadcasting, program pictures can be instantly displayed in response to the viewer's selecting broadcasting channels. However, in a case of a broadcasting system using the foregoing signal processing by software, when in the channel selection using EPG, for a chosen channel, no software program for decoding its broadcast data is held in advance, a delay downloading the program makes it difficult to display a program picture in a short time.

As hereinbefore pointed out, in a broadcasting system using signal processing by software, when not holding a decoding software program (library) for decoding received broadcast data, in its own program storage unit, a broadcasting reception apparatus must download the library via broadcasting. When, as shown in FIG. 44(b), an exclusive channel is set up apart from the channels for broadcast data to repeatedly transmit a plurality of libraries for decoding the broadcast data, unless the order of the plurality of libraries provided is planned cleverly, it is not possible to obtain a library necessary for the broadcasting reception apparatus, so it adversely takes long time to display a program. Particularly, when zapping operation is performed in the broadcasting reception apparatus to check the contents of programs in a way in which plural channels are switched at random in a short time, delays downloading libraries prevent smooth zapping.

SUMMARY OF THE INVENTION

It is an object of the present invention to provide a broadcasting reception apparatus in which a viewer can check for what channel a decoding software program (library) is available in a library buffer of the broadcasting reception apparatus, or can check what channel, for which a decoding library is not held in the library buffer, can be nevertheless listened or watched in a short waiting time because it takes a short time to download the library, thereby make possible pleasant zapping.

It is another object of the present invention to provide a broadcasting reception apparatus in which a waiting time for download is reduced by fetching a decoding software program (library) for decoding a broadcast signal in advance, in a system transmitting software.

It is still another object of the present invention to provide a broadcasting reception apparatus receiving a broadcast signal in a system transmitting software, in which a waiting time for download is reduced in selecting channels using EPG.

It is yet another object of the present invention to provide a broadcasting reception method with which a waiting time for downloading a decoding software program (library) for decoding a broadcast signal is reduced, in a system transmitting software.

Other objects and advantages of the present invention will become apparent from the detailed description desired hereinafter; it should be understood, however, that the detailed description and specific embodiment are desired by way of illustration only, since various changes and modifications within the scope of the invention will become apparent to those skilled in the art from this detailed description.

According to a first aspect of this invention, there is provided a broadcasting reception apparatus receiving broadcast signals transmitted with a data broadcasting method of transmitting program signals of two or more kinds of broadcasting formats via a plurality of channels, said apparatus comprising:

a library buffer for holding decoding software programs for decoding program signals;

a checker for deciding whether said library buffer holds decoding software programs for decoding program signals being transmitted via each of said plurality of channels, or not; and a channel display unit for presenting a display based on a result of the decision by said checker, the display making it possible to recognize whether said library buffer holds decoding software programs for decoding program signals being transmitted via each channel, or not.

Therefore, the user can recognize which channel can be decoded by decoding software programs (libraries) held in a library buffer, thereby making possible pleasant zapping.

According to a second aspect of this invention, there is provided a broadcasting reception apparatus receiving broadcast signals transmitted with a data broadcasting method of transmitting program signals of two or more kinds of broadcasting formats, and decoding software programs for decoding the program signals, via a plurality of channels, said apparatus comprising:

a library buffer for holding decoding software programs for decoding program signals;

a program obtaining unit for obtaining decoding software programs for decoding program signals from the broadcast signals, and storing the decoding software programs in said library buffer;

a checker for deciding whether said library buffer holds decoding software programs for decoding program signals being transmitted via each of said plurality of channels, or not, and for a channel for which said library buffer does not hold decoding software programs, predicting time which it takes to obtain the decoding software program by said program obtaining unit; and a channel display unit for presenting a display based on a result of the decision by said checker, the display making it possible to recognize whether said library buffer holds a decoding software program for decoding a program signal being transmitted via each channel, or not, and whether it takes a long or short time to obtain a decoding software program by said program obtaining unit, for a channel for which said library buffer does not hold the decoding software program.

Therefore, the user can recognize which channel can be decoded by decoding software programs held in a library buffer, and which channel will be listened or watched in a short waiting time because it takes a short time to download libraries although the channel is decoded with the libraries not held in the library buffer, thereby making possible pleasant zapping.

According to a third aspect of this invention, there is provided the broadcasting reception apparatus of the second aspect wherein said checker predicts time which it takes to obtain a decoding software program by said program obtaining unit, based on the size of the decoding software program.

Therefore, the user can recognize which channel can be decoded by decoding software programs held in a library buffer, and which channel will be listened or watched in a short waiting time because it takes a short time to download libraries although the channel is decoded with the libraries not held in the library buffer, thereby making possible pleasant zapping.

According to a fourth aspect of this invention, there is provided the broadcasting reception apparatus of the second aspect wherein said checker predicts time which it takes to obtain a decoding software program by said program obtaining unit, based on the size of the decoding software program and the incidence of the decoding software being provided by broadcasting.

Therefore, it is possible to more precisely predict time which it take to obtain decoding software programs by said program obtaining unit, so the user can recognize which channel can be decoded by decoding software programs held in a library buffer, and which channel will be listened or watched in a short waiting time because it takes a short time to download libraries although the channel is decoded with the libraries not held in the library buffer, thereby making possible pleasant zapping.

According to a fifth aspect of this invention, there is provided the broadcasting reception apparatus of any of the first and second aspects wherein said channel display unit presents the channel display on an EPG display screen used for selecting receiving channels.

Therefore, receiving channels are selected using a channel display.

According to a sixth aspect of this invention, there is provided the broadcasting reception apparatus of any of the first and second aspects wherein said channel display unit presents the channel display on a portion of the display screen while said broadcasting reception apparatus displays a program on a display screen, or on a display unit set up apart from said broadcasting reception apparatus.

Therefore, while listening to or watching a program, else situations of the other channels can be checked.

According to a seventh aspect of this invention, there is provided a broadcasting reception apparatus receiving broadcast signals transmitted with a data broadcasting method of transmitting program signals of two or more kinds of broadcasting formats, and decoding software programs for decoding the program signals, via a plurality of channels, said apparatus comprising:

a library buffer for holding decoding software programs for decoding program signals;

a download priority order determining unit for determining the order of priority of downloading decoding software programs, using a library EPG which is a list showing decoding software programs for decoding programs transmitted via the plurality of channels in a matrix of channel and time; and a download unit for downloading decoding software programs by broadcasting, based on the order of download priority determined by said download priority order determining unit, and storing the decoding software programs in said library buffer.

Therefore, it is possible to reduce a download waiting time in zapping, thereby making possible pleasant zapping.

According to an eighth aspect of this invention, there is provided the broadcasting reception apparatus of the seventh aspect wherein said download priority order determining unit counts up the number of programs decoded by each decoding software program from a present time to a predetermined time after, using a library EPG, and determines the order of download priority according to a result of the counting.

Therefore, even when libraries used in each channel are changed, it is possible to reduce a download waiting time in zapping, thereby making possible pleasant zapping.

According to a ninth aspect of this invention, there is provided the broadcasting reception apparatus of the eighth aspect further includes a library size detector for detecting the size of a decoding software program described in a library EPG; and an empty amount detector for detecting the empty amount of said library buffer, said download priority order determining unit determining the order of download priority, based on a result of the counting and results of said library size detector and said empty amount detector.

Therefore, it is possible to effectively reduce a download waiting time in zapping, thereby making possible pleasant zapping.

According to a tenth aspect of this invention, there is provided the broadcasting reception apparatus of the seventh aspect further includes a past audience record holding unit for holding a past audience record of the user, said download priority order determining unit determining the order of download priority based on an audience tendency found from a library EPG and the past audience record.

Therefore, it is possible to reduce a download waiting time in zapping, depending on the user's audience tendency, thereby making possible pleasant zapping.

According to an eleventh aspect of this invention, there is provided the broadcasting reception apparatus of the tenth aspect wherein said download priority order determining unit uses the total audience time of channels listened or watched by the user, as the audience tendency.

Therefore, especially when the user listens to or watches, switching among his/her favorite channels, it is possible to reduce a download waiting time in zapping, thereby making possible pleasant zapping.

According to a twelfth aspect of this invention, there is provided the broadcasting reception apparatus of the tenth aspect wherein said download priority order determining unit uses the number of times of audience of channels listened or watched at the same time in the past, as the audience tendency.

Therefore, especially when the user listens to or watches a fixed programs at a fixed time, it is possible to reduce a download waiting time in zapping, thereby making possible pleasant zapping.

According to a thirteenth aspect of this invention, there is provided the broadcasting reception apparatus of the seventh aspect further includes a genre-categorized program table holding unit for holding a genre-categorized program table in which the genre of each program is described; and a genre holding unit for holding the user's favorite genres, said download priority order determining unit determining the order of download priority based on a library EPG and programs of the genres found from the genre-categorized program table and the user's favorite genres.

Therefore, especially when the user listens to or watches channels of the user's favorite genres frequently, it is possible to reduce a download waiting time in zapping, thereby making possible pleasant zapping.

According to a fourteenth aspect of this invention, there is provided the broadcasting reception apparatus of the seventh aspect further includes a preset channel holding unit for holding a plurality of channels preset in a remote control with which the user selects channels, said download priority order determining unit determining the order of download priority based on a library EPG and the channels held in said preset channel holding unit.

Therefore, especially when the user zaps using a remote control presetting channels, it is possible to reduce a download waiting time in zapping, thereby making possible pleasant zapping.

According to a fifteenth aspect of this invention, there is provided a broadcasting reception apparatus receiving broadcast signals transmitted with a data broadcasting method of transmitting program signals of two or more kinds of broadcasting formats, and decoding software programs for decoding the program signals, via a plurality of channels, a plurality of cells corresponding to the plurality of channels being disposed in an m×n matrix (m and n are natural numbers) on an EPG picture, a receiving channel being selected by choosing one of the plurality of cells on the EPG picture, shifting a cursor from a cell to one of cells adjacent to the former cell by one operation of a remote control, said broadcasting reception apparatus comprising:

a library buffer for holding decoding software programs; and a program download unit for deciding whether decoding software programs for decoding programs transmitted via channels indicated on the EPG picture by a cell pointed by the cursor and its adjacent cells, are held in said library buffer, or not, and when the decoding software program is not held in said library buffer, downloading the decoding software program by broadcasting, and storing the decoding software program in said library buffer.

Therefore, it is possible to reduce a download waiting time in a broadcasting reception apparatus selecting channels using an EPG.

According to a sixteenth aspect of this invention, there is provided a broadcasting reception apparatus receiving broadcast signals transmitted with a data broadcasting method of transmitting program signals of two or more kinds of broadcasting formats, and decoding software programs for decoding the program signals, via a plurality of channels, a plurality of cells corresponding to the plurality of channels being disposed in an m×n matrix (m and n are natural numbers) on an EPG picture, a receiving channel being selected by choosing one of the plurality of cells on the EPG picture, shifting a cursor from a cell to one of cells adjacent to the former cell by one operation of a remote control, said broadcasting reception apparatus comprising:

a library buffer for holding decoding software programs; and a program download unit for deciding whether, assuming that a first cell is among the plurality of cells, the cursor shifts from the first cell to a second cell adjacent to the first cell, a third cell is among cells adjacent to the second cell, and positioned in the direction of the cursor shifting, and fourth and fifth cells are adjacent to both of the second and third cells, decoding software programs for decoding programs transmitted via channels indicated on the EPG picture by second, third, fourth, and fifth cells, are held in said library buffer, or not, and when the decoding software program is not held in said library buffer, downloading the decoding software program by broadcasting, and storing the decoding software program in said library buffer.

Therefore, it is possible to reduce a download waiting time in a broadcasting reception apparatus selecting channels using an EPG.

According to a seventeenth aspect of this invention, there is provided a broadcasting reception apparatus receiving broadcast signals transmitted with a data broadcasting method of transmitting program signals of two or more kinds of broadcasting formats, and decoding software programs for decoding the program signals, via a plurality of channels, a plurality of cells corresponding to the plurality of channels being disposed in an m×n matrix (m and r are natural numbers) on an EPG picture, a receiving channel being selected by choosing one of the plurality of cells on the EPG picture, shifting a cursor from a cell to one of cells adjacent to the former cell by one operation of a remote control, said broadcasting reception apparatus comprising:

a display controller for controlling the display of an EPG picture in a way in which cells of the channels, via which program signals transmitted are decoded with the same decoding software program, are clustered together on the EPG picture.

Therefore, when selecting channels on an EPG picture, after a channel is chosen, and libraries for the channel are downloaded, the download waiting times for channels using the libraries, neighboring the former channel, are not required, thereby making possible pleasant zapping.

According to an eighteenth aspect of this invention, there is provided a broadcasting reception apparatus receiving broadcast signals transmitted with a data broadcasting method of transmitting program signals of two or more kinds of broadcasting formats, and decoding software programs for decoding the program signals, via a plurality of channels, a plurality of cells corresponding to the plurality of channels being disposed in an m×n matrix (m and n are natural numbers) on an EPG picture, a receiving channel being selected by choosing one of the plurality of cells on the EPG picture, shifting a cursor from a cell to one of cells adjacent to the former cell by one operation of a remote control, said broadcasting reception apparatus comprising:

a display controller for controlling the display of an EPG picture in a way in which cells of the channels, via which program signals transmitted are decoded with decoding software programs stored in said library buffer, are clustered together on the EPG picture.

Therefore, if any channel in the cluster on the EPG picture is selected, a download waiting time is not required in selecting channels, thereby making possible pleasant zapping.

According to a nineteenth aspect of this invention, there is provided a broadcasting reception apparatus receiving broadcast signals transmitted with a data broadcasting method of transmitting program signals of two or more kinds of broadcasting formats, and decoding software programs for decoding the program signals, via a plurality of channels, a plurality of cells corresponding to the plurality of channels being recursively disposed in an m×n matrix (m and n are natural numbers) on an EPG picture displayed on a display screen, a remote control having input keys arranged in an m×n matrix, a receiving channel being selected by, after cells are continually selected one time less than the number of recurring times of cell arrangement until only a minimum unit of m×n matrix is shown on the EPG picture, choosing a cell of the minimum unit of m×n matrix on the EPG picture by choosing an input key on the corresponding position of the remote control, said broadcasting reception apparatus comprising:

a library buffer for holding decoding software programs;

a program download unit for deciding whether decoding software programs for decoding programs transmitted via channels indicated by cells on the minimum unit of m×n matrix after cells are continually selected one time less than the number of recurring times of cell arrangement, are held in said library buffer, or riot, and when the decoding software program is not held in said library buffer, downloading the decoding software program by broadcasting, and storing the decoding software program in said library buffer.

Therefore, it is possible to reduce a download waiting time in a broadcasting reception apparatus selecting channels using an EPG.

According to a twentieth aspect of this invention, there is provided a data broadcasting method of transmitting program signals of two or more kinds of broadcasting formats, and transmitting decoding software programs via a plurality of channels other than the former plurality of channels, said method comprising:

a first step for calculating the number of programs to be decoded by each decoding software program at a certain time, using library EPG data showing decoding software programs for decoding programs transmitted via the former plurality of channels, along the time axis; and a second step for providing the plurality of decoding software programs, the number of each decoding software program to be provided being determined according to the ratio of the number of programs calculated in said first step.

Therefore, the higher rate a library is downloaded at, the more incidence the library is provided at, so it is possible to reduce a waiting time of downloading a library on the receiving side, thereby making possible smooth zapping, especially when zapping is performed on the receiving side.

According to a twenty-first aspect of this invention, there is provided the data broadcasting method of the twentieth aspect wherein the plurality of decoding software programs are distributedly provided, depending on the number of each decoding software program to be provided.

Therefore, it is possible to reduce further a waiting time of downloading a library on the receiving side.

According to a twenty-second aspect of this invention, there is provided a data broadcasting method of transmitting program signals of two or more kinds of broadcasting formats, and transmitting decoding software programs via a plurality of channels other than the former plurality of channels, said method comprising:

a first step for calculating the number of programs to be decoded by each decoding software program at a certain time, using library EPG data showing decoding software programs for decoding programs transmitted via the former plurality of channels, along the time axis;

a second step for calculating the total audience rates of respective programs to be decoded with each of the plurality of decoding software program; and a third step for providing the plurality of decoding software programs, the number of each decoding software program to be provided being determined according to the ratio of values resulting from multiplying the number of programs calculated in said first step and the total audience rate calculated in said second step.

Therefore, the higher rate a library is downloaded at, the more incidence the library is provided at, so it is possible to reduce a waiting time of downloading a library on the receiving side, thereby making possible smooth zapping, especially when zapping is performed on the receiving side.

According to a twenty-third aspect of this invention, there is provided the data broadcasting method of the twenty-second aspect wherein the plurality of decoding software programs are distributedly provided, depending on the number of each decoding software program to be provided.

Therefore, it is possible to reduce further a waiting time of downloading a library on the receiving side.

BRIEF DESCRIPTION OF THE DRAWINGS

FIG. 3 is a diagram showing another example of a channel display presented by the broadcasting reception apparatus of the first embodiment.

FIG. 4 is a diagram showing another example of a channel display presented by the broadcasting reception apparatus of the first embodiment.

FIG. 5 is a diagram showing another example of a channel display presented by the broadcasting reception apparatus of the first embodiment.

FIG. 6 is a diagram for explaining the operation of the broadcasting reception apparatus of the first embodiment when a library comprises a plurality of sub-library components.

FIG. 23 is a diagram showing an example of an EPG picture displayed by a broadcasting reception apparatus in accordance with a sixth embodiment of this invention.

FIG. 26 is a diagram for explaining the operation of selecting channels in the broadcasting reception apparatus of the eighth embodiment.

FIG. 27 is a diagram for explaining the operation or selecting channels in the broadcasting reception apparatus of the eighth embodiment.

FIG. 28 is a diagram for explaining the operation of selecting channels in the broadcasting reception apparatus of the eighth embodiment.

FIG. 29 is a diagram for explaining the operation of selecting channels in the broadcasting reception apparatus of the eighth embodiment.

FIG. 30 is a diagram for explaining the operation of selecting channels in the broadcasting reception apparatus of the eighth embodiment.

FIG. 31 is a diagram for explaining the operation of selecting channels in the broadcasting reception apparatus of the eighth embodiment.

FIG. 39 is a diagram for explaining the data broadcasting method of the tenth embodiment.

FIG. 40 is a diagram for explaining the data broadcasting method of the tenth embodiment.

FIGS. 44(a) and 44(b) are diagrams showing how decoding software programs for decoding broadcast data are provided by broadcasting.

DETAILED DESCRIPTION OF THE PREFERRED EMBODIMENTS

Embodiment 1

Figures 1, 2:
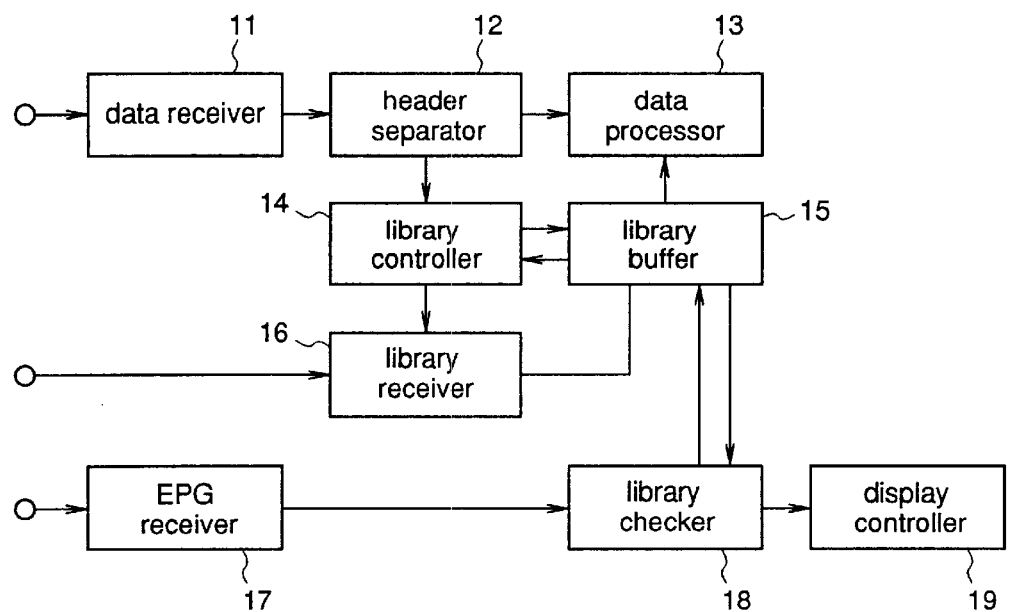
FIG. 1 is a block diagram showing a structure of a broadcasting reception apparatus in accordance with a first embodiment of this invention.
FIG. 2 is a diagram showing an example of a channel display presented by the broadcasting reception apparatus of the first embodiment.

FIG. 1 is a diagram showing a structure of a broadcasting reception apparatus in accordance with a first embodiment of this invention. In the figure, reference numeral 11 denotes a data receiver receiving broadcast signals of a program (hereinafter referred to as program signals) provided by a broadcaster. The program signal comprises a data part and a header part. In the header part, attribute data, such as the name of a decoding software program for decoding the data, is described. 12 is a header separator separating a program signal received in the data receiver 11 into the data part and the header part, outputting the header part to a library controller 14 described hereinafter, and outputting the data part to the data processor 13 described hereinafter. 16 is a library receiver receiving a decoding software program (library) for decoding a program signal, via broadcasting. The library controller 14 detects the name of a library for decoding a program signal from the header part obtained from the header separator 12, and checks whether the library is held in a library buffer or not. 15 is the library buffer holding the library received in the library receiver 16. The data processor 13 decodes the data output by the header separator 12 using the library held in the library buffer 15. 17 is an EPG receiver receiving EPG data used in selecting channels in the broadcasting reception apparatus. In the EPG data, the names of libraries for decoding the program signals on the respective channels are described. 18 is a library checker comparing the name of libraries described in the EPG data with libraries in the library buffer 15. 19 is a display controller controlling the display of an EPG picture on a display screen.

FIG. 2 is a diagram illustrating an example of a channel display presented by the broadcasting reception apparatus in accordance with the first embodiment.

A description will be given of the operation of the broadcasting reception apparatus.

In the apparatus, the library checker 16 detects the name of a library used for decoding program data for each channel based on the EPG data received by the EPG receiver 17, and checks whether the library is field in the library buffer 15 or not. The display controller 19 displays the state of each channel, as shown in FIG. 2, based on a result of the check by the library checker 18. To be specific, for example, a o is displayed for a channel for which a library is held in the library buffer 15, while a X is displayed for a channel for which a library is not held in the library buffer 15. By seeing this display, a user verifies channels which can present a program immediately because the library is held in the library buffer 15, and can select such channels, thereby making possible pleasant zapping.

As described above, the broadcasting reception apparatus in accordance with the first embodiment receives broadcast signals transmitted according to a data broadcasting method sending program signals of two or more kinds of broadcasting formats via a plurality of channels, and comprises the library buffer 15 holding decoding software programs for decoding program signals, the library checker 18 checking, for each channel, whether a decoding software program necessary for decoding a program signal transmitted via the channel is held in the library buffer 15 or not, and the display controller 19 presenting a display having the plurality of channels, by which the viewer verifies, for each channel, whether a decoding software program necessary for decoding a program signal transmitted via the channel is held in the library buffer 15 or not. Thus, the viewer can check for what channel a decoding software program (library) is available in a library buffer of a broadcasting reception apparatus, thereby making possible pleasant zapping.

In the description of the first embodiment, the names of libraries for decoding program data for each channel are described in the EPG data, and the library checker 18 detects tho name of a library to be used for decoding program data for each channel based on information about which cell is indicated by a cursor. However, when the names of libraries for decoding program data for each channel are not described in the EPG data, the data receiver 11 receives program signals, switching a plurality of channels successively, and the header separator 12 extracts the header part of the program signal of each channel, and outputs it to the library controller 14, and the library controller 14 detects the name of a library for decoding the program signal for each channel by reading the header part of the program signal, and checks whether the library is held in the library buffer 15 or not, whereby the same effect is realized.

In a system in which a library for decoding program data of each channel is provided via broadcasting, a library to be used for decoding program data, which is not held in the library buffer 15, it obtained using the library receiver 16. Hence, a program on the channel, which is decoded using the library, can be listened or watched. In this situation, the operation of the broadcasting reception apparatus in accordance with the first embodiment will be explained.

The library checker 18 detects the nine of a library for decoding program data of each channel based on EPG data received by the EPG receiver 17, and then, checks whether the library is held in the library buffer 15 or not. The library checker 18 further predicts a time necessary for the library receiver 16 downloading the libraries that are riot held in the library buffer 15, based on information about the size of each library. The display controller 19 presents a channel display showing the state of each channel, as shown in FIG. 2, on the basis of results of the check and prediction by the library checker 18. Specifically, for example, channels for which libraries are held in the library buffer 15 are indicated by ○, channels for which libraries are not held in the library buffer 15, but it takes within 3 seconds to download the library are indicated by Δ, and channels for which libraries are not held in the library buffer 15, but it takes 3 seconds or more to download the library are indicated by X. By listening to or watching thins display, the viewer can recognize which channel can present pictures because the library is held in the library buffer 15, and can know whether it takes a long or short time to download the library for a channel which is not held in the library buffer 15 and display its program pictures.

Thus, it is possible to select channels which can present program pictures immediately or after a short waiting time, thereby making possible pleasant zapping.

When a program exclusive channel is, as shown in FIG. 44(*b*), set up for broadcasting only decoding software programs for decoding broadcast data apart from channels for broadcasting broadcast data, and the decoding software programs are repeatedly transmitted via the program exclusive channel, if the library receiver receives the program exclusive channel to check the incidence of each library in advance, and predicts a time necessary to download each library by taking also the incidence into account, the predicted time becomes more precise.

Although in the first embodiment the state of each channel is presented on the EPG picture to select programs, a way of displaying the state of each channel is not restricted to this.

For example, as shown in FIG. 3, channels possible to listen to or watch may be displayed on the screen in listening to or watching a program. In an example shown in FIG. 3, only channels, which would be indicated by ○ in the foregoing description, are displayed on the display screen of a program being listened of watched. In the figure, a frame surrounding '2' indicates a position pointed by a cursor controlled by the arrow keys of a remote control and the like. That is, in this example, channels possible to immediately listen to or watch are displayed on the screen while a cursor is displayed and the viewer can choose a channel to be received by shifting the cursor using keys of a remote control.

Only channels possible to immediately listen to or watch are displayed in FIG. 3. As shown in FIG. 4, however, all channels are displayed, and channels possible to immediately listen to or watch may be indicated by changing the size or color of the font of the channel number. Or channels possible to immediately listen to or watch may be highlighted, channels possible to listen to or watch after waiting in a short time may be blinked, and channels possible to listen to or watch a long time after may be black-and-white reversed. In the example in FIG. 4, channels are displayed up to channel 10. However, the remote control can scroll channels to show channel 11 and the following. That is, if a button 'next' of the remote control is pushed, channel 11 to 20 are displayed. If the button 'next' is further pushed, channel 21 to 30 are displayed. Further, channel selection by a remote control may be performed by choosing a channel number directly by the number keys of the remote control, or by shifting a cursor position by the arrow keys of the remote control. When the channel selection is performed by shifting a cursor, and channels other than those possible to immediately listen to or watch are also displayed as shown in FIG. 4, the cursor does not shift its position in order in response to pushing on the arrow key of a remote control, but the cursor may take its position only on channels possible to immediately listen to or watch.

Although in FIG. 3 channels are displayed on the display screen of a program being listened or watched, another frame is used on the screen for the channels apart from a frame for displaying the program as shown in FIG. 5. The broadcasting reception apparatus may further include a means for displaying channels other than a cathode-ray tube.

In the first embodiment, a library is a program which can not be divided. However, when a plurality of sub-library components constitute a library, and the combination of the sub-library components makes various libraries, channels possible to be decoded by the combination of sub-library components held in a library buffer may be indicated by ○, channels possible to be decoded by a sub-library component to be downloaded and sub-library components held in the library buffer may be indicated by Δ, and channels, which two or more sub-library components to be downloaded are needed for constituting a library for decoding, may be indicated by X. That is, channels are displayed depending on what sub-library is held.

The case where a plurality of sub-library components constitute a library, will be explained in detail. FIG. 6 is a conceptual diagram showing a sub-library. As is apparent from the figure, d sub-library is a unit of program constituting a library. Here, sub-libraries a, b, and c constitute a library A; sub-libraries d, e, and f, a library B; sub-libraries a, b, and e, a library C; sub-libraries a, d, and g, a library D; and sub-libraries h, i, and j, a library E. Now, it is assumed that the library buffer of a broadcasting reception apparatus stores the libraries A and B. When it is decided whether a channel is possible to listen to or watch, or not, if a library has not been divided into components, channels using the libraries C, D, and E are indicated by X because it is decided that it takes a long time for the channel to become possible to listen to or watch. However, if components constitute a library, the components a, b, and e are to constitute the library C, and these components are already stored in the library buffer, so that the channel using the library C is indicated by ○. The components a, d, and g are to constitute the library D, and only the component g should be downloaded, so the channel using the library D is indicated by Δ. The components h, i, and j are to constitute the library E, and all the components should be downloaded, so the channel using the library E is indicated by X. Note that channels may be displayed on EPG, or on the display screen of a program being listened or watched.

Embodiment 2

Figure 7:
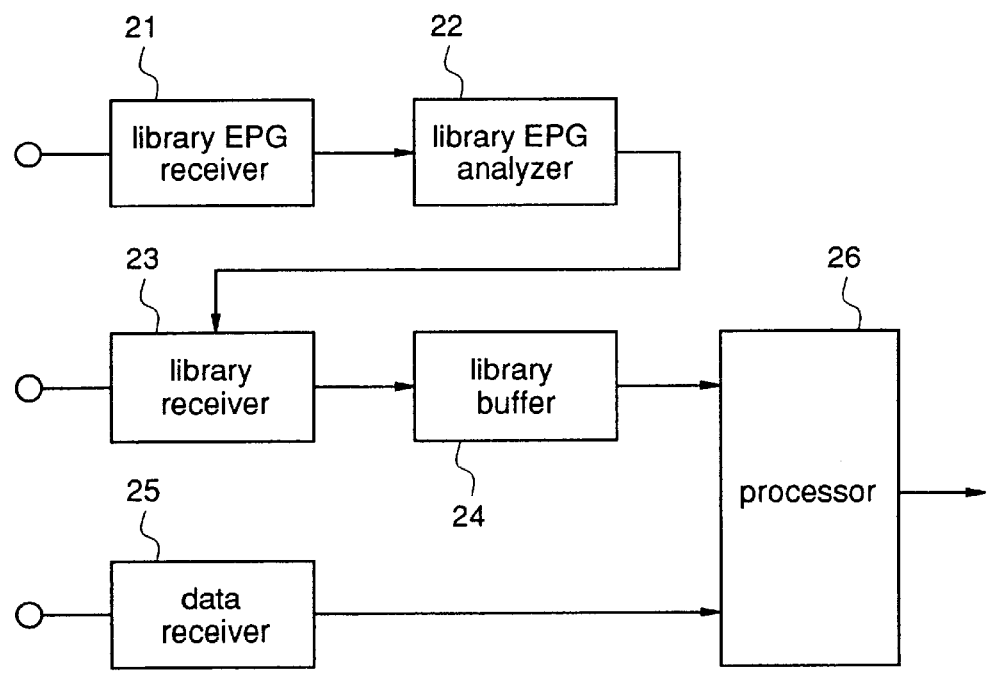
FIG. 7 is a block diagram showing a structure of a broadcasting reception apparatus in accordance with a second embodiment of this invention.

FIG. 7 is a diagram showing a structure of a broadcasting reception apparatus in accordance with a second embodiment of this invention. In the figure, reference numeral 21 designates a library EPG receiver receiving a library EPG provided by a broadcaster; 22, a library EPG analyzer analyzing the library EPG received by the library EPG receiver 21, and controlling a library receiver described below, based on a result of the analysis; 23, a library receiver receiving libraries provided by the broadcaster; 24, a library buffer holding the libraries received by the library receiver 23; 25, a data receiver receiving broadcast signals of a program; and 26, a processing unit decoding the program signals received by the data receiver 25, using the library held by the library buffer 24.

Figure 8:
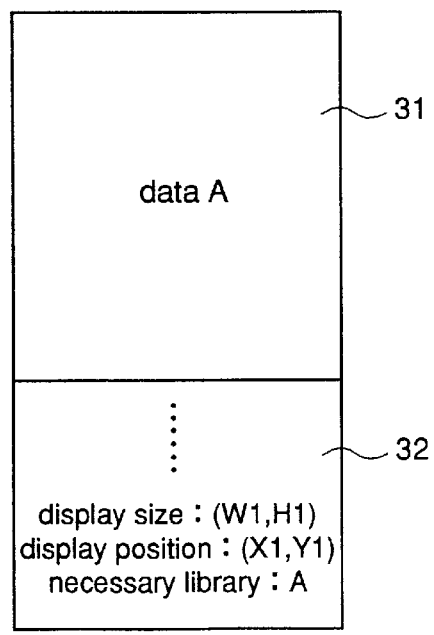
FIG. 8 is a diagram showing an example of a structure of a broadcast signal of a program provided by a broadcaster.
Figures 9, 10:
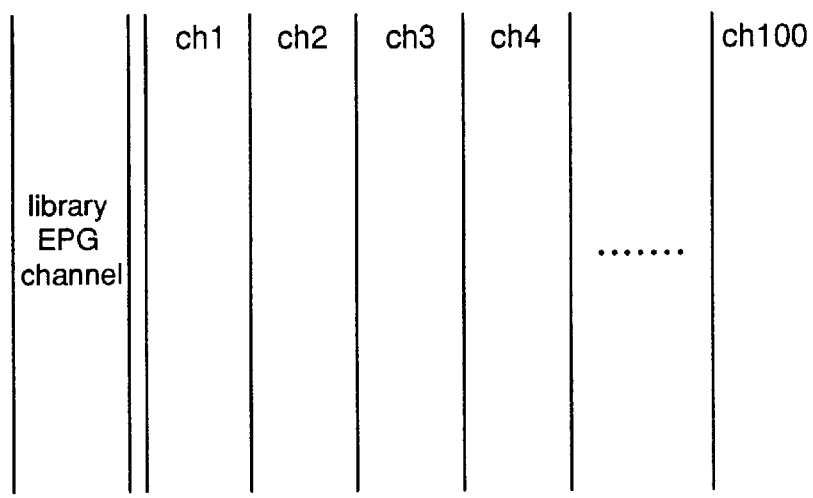
FIG. 9 is a diagram for explaining a library EPG channel.
FIG. 10 is a diagram showing an example of a library EPG used in this invention.

FIG. 8 is a diagram showing an example of a structure of a broadcast signal of a program provided by a broadcaster. As shown in FIG. 8, the broadcast signal comprises a data part 31 and a header part 32. In the header part 32, the name of a decoding software program (library) for decoding data in the data part 31, and attribute data, such as the display position and display size of the data, are described. That is, data A is decoded using a library A, and displayed at a position (Xl, Yl) on a screen, in a size (W1, Hl). The software library A described in the header part is just a pointer indicating the library A, so the library A itself must be fetched. The library A itself may be supplied from a CD-ROM or hard disk, or via A network In this case, as shown in FIG. 3, a case will be discussed where the library A is downloaded using a channel (library EPG channel) of broadcasting. In FIG. 9, libraries themselves, i.e., data of software programs, used for all channels, i.e., channel 1 to channel 100, are provided via the library EPG channel.

Further, the broadcasting reception apparatus downloads libraries according to a library EPG which is a list showing a program on which time zone, on which channel is decoded using which decoding software program, or library. The data of the library EPG is also provided via the library EPG channel. In FIG. 10, A to D are the names of libraries which are used in time zones. For example, on the, channel 1, the library A is used from time T1 to time T2, and the libraries A and B are used from time T2 to time T3.

Figure 11:
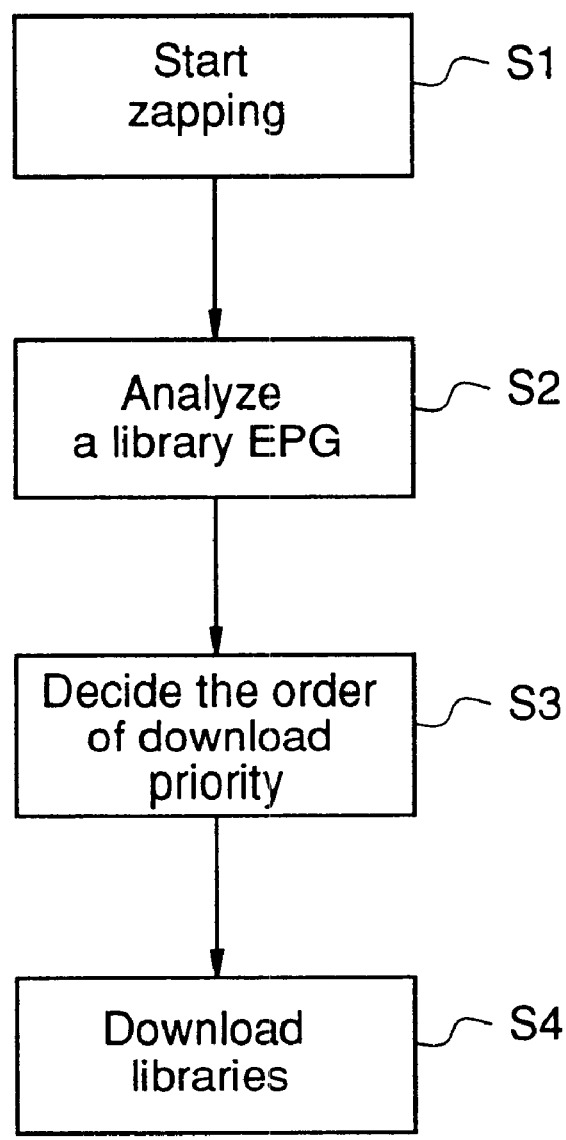
FIG. 11 is a flowchart for explaining the operation of the broadcasting reception apparatus of the second embodiment.

FIG. 11 is a flowchart showing the operation of the broadcasting reception apparatus in accordance with the second embodiment in performing zapping operation. The operation of the broadcasting reception apparatus will be described with reference to FIG. 11.

When the broadcasting reception apparatus starts zapping (S1), the library analyzer 22 analyzes the library EPG data received by the library EPG receiver 21 as a list shown in FIG. 10. Specifically, when the current time is t, the number of libraries at time (t+α) when libraries will be actually required for zapping are counted. In FIG. 10, the numbers of libraries are four As, two Bs, zero C, and one D at time (t+α). The library EPG analyzer 22 gives priority to the library having the larger number, decides to download the library first (S3), and outputs a control signal to the library receiver 23. According to the control signal, the library receiver 23 downloads the libraries in the order determined by the control signal (S4), and stores the libraries in the library buffer 24.

For example, at time t, if it is assumed that the user listens to or watches channel 1, the library buffer has stored the library A. As time t+α, the order of priority is A, B, D, and C, and the library A has been already stored in the library buffer, so that the libraries B, C, and D are download in order of B→D→C, within the size of the library buffer. For instance, if the library buffer has as large an amount as stores two libraries, the library buffer stores the libraries A and B. Therefore, switching a channel to channel 3, 4, and 5 can be done smoothly with no download time. When switching to channel 2, only the library D must be downloaded, so the download time is half compared with when both libraries B and D are downloaded. If the library buffer has an amount enough to store three libraries, because the libraries B, C, and D are downloaded at time t, a waiting time is zero when switching to any channel.

In the second embodiment, since the number of libraries used are counted between time t and time t+α, which is at a constant time after time t, and the order of download is determined. Even when libraries used on each channel change in zapping, libraries to be needed later for zapping are efficiently fetched in advance. That is, some time after the above example, when time T2 comes between time t and time t+α, and libraries used for each channel, change, the library EPG analyzer 22 counts the number of libraries used at time t+α, and decides the order or priority to download the libraries. Thus, when time t becomes time T2, necessary libraries have been already in the library buffer, zapping can be smoothly performed without any waiting time. For example, when either of channel 1 to channel 5 uses only the library A between time T1 and time T2, and then, the channel C uses both the library A and the library B after time T2, if the user zaps from channel 1 to channel 5 in order, and zaps channel 1 again after time T2, the library B for decoding broadcast signals on channel 1 has been already in the library buffer, so smooth zapping can be performed with no waiting time.

As described above, the broadcasting reception apparatus in accordance with the second embodiment receives broadcast signals transmitted according to a data broadcasting method sending program signals of two or more kinds of broadcasting formats via a plurality of channels, and includes the library EPG analyzer 22 deciding the order of priority to download decoding software programs for decoding broadcast signals transmitted via the plurality of channels, using the library EPG which is a list showing the decoding software programs in a matrix of channel and time. The broadcasting reception apparatus downloads the decoding software program according to the download priority determined by the library EPG analyzer 22, thereby reducing awaiting time for download in zapping, and realizing a broadcasting reception means capable of pleasant zapping.

Although in the second embodiment libraries and library EPG data are provided via an independent channel different from channels transmitting broadcast signals of programs, the libraries and the library EPG data can be multiplexed into the empty region of each channel, or can be downloaded via package media, networks, or the like.

Further, the above-described libraries each may be a complete program or a dynamic link library.

Furthermore, if the library EPG has size information on each library, the library EPG analyzer 22 may detect the size of a library and the size of the empty region of a library buffer, and may decide the order of the download priority so as to exploit the library buffer effectively.

Figure 17:
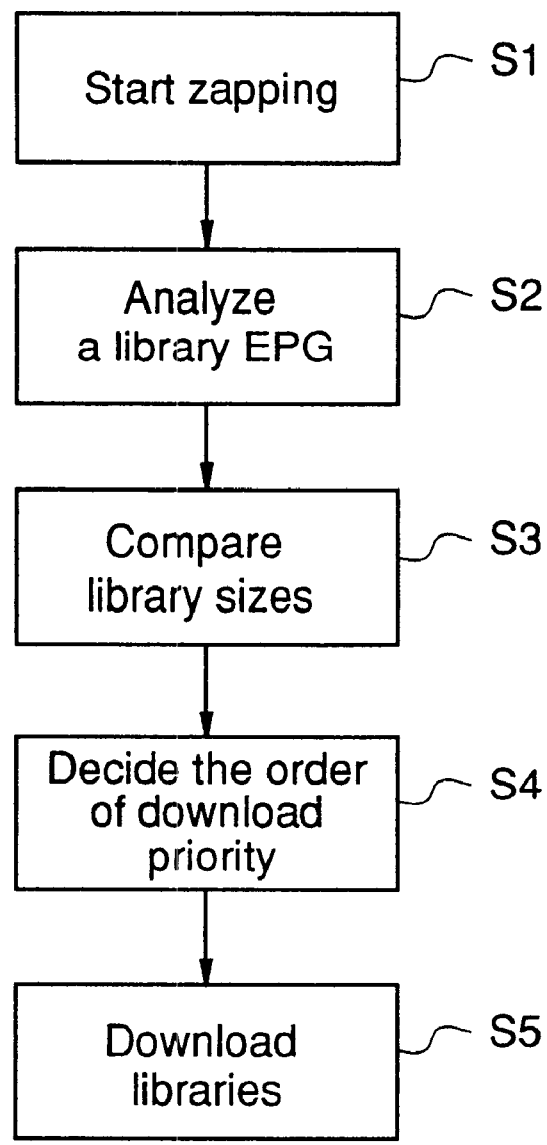
FIG. 17 is a flowchart showing the operation of the broadcasting reception apparatus of the third embodiment when the order of download priority is determined, taking into account the sizes of libraries, and the amount of the empty regions of a library buffer.

FIG. 17 is a flowchart showing the operation in the case where the order of the download priority is decided by taking into account the size of a library and the size of the empty region of a library buffer.

Figure 16:
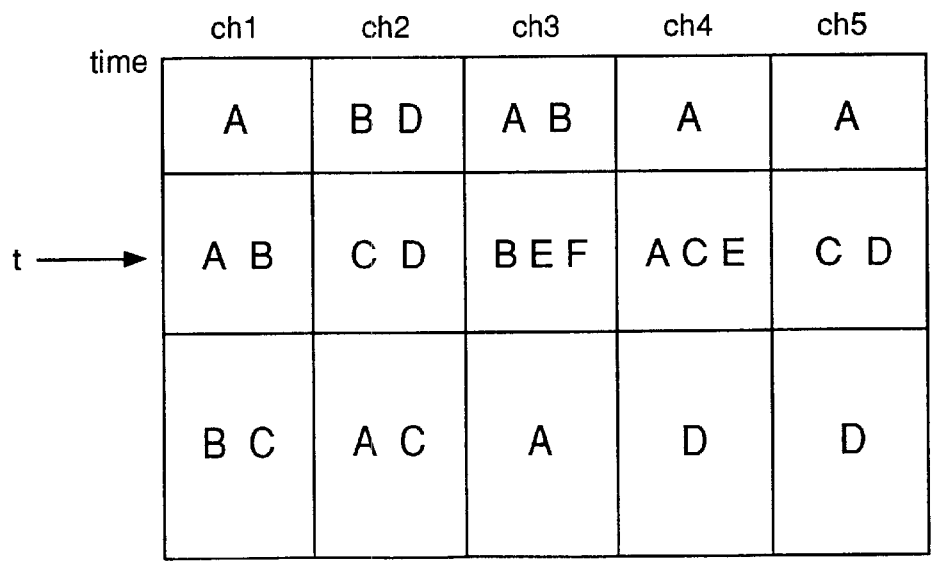
FIG. 16 is a diagram showing an example of a library EPG used in this invention.

When starting zapping (S1), the library EPG analyzer 22 analyzes library EPG data received by the library EPG receiver 21, and produces a list of the library EPG, data (S2). For example, if it is assumed that the library EPG is like FIG. 16, when the number of libraries used at time t is counted, there are two library As, three library Bs, three library Cs, two library Ds, two library Es, and one library Fs. As to priority, for example, when listening to or watching channel 1, because the library A and the library B have been already stored in the library buffer, the library C has the first priority; the libraries D and E, the second priority; and the library F, the third priority. Thereafter, the size of a library, and the size of the empty region of the library buffer arc detected and compared with each other (S3). For example, it is assumed that the size of the library C is 100K byte, the sizes of the libraries D, E, and F each are 20K byte, and the size of the empty region of the library buffer is 110K byte. If the library C is downloaded, only the library C occupies the region. If the libraries D, E, and F are downloaded, the three libraries can be stored in the library buffer. There are three channels requiring the library C, i.e., channel 2, channel 4, and channel 5. However, it is not possible to listen to or watch those channels if only the library C is downloaded. On the other hand, if the libraries D, E, and F are downloaded, channel 3 is possible to listen to or watch. Consequently, when the library EPG analyzer 22 decides the order of download priority by taking into account the library size and the empty region size of a library buffer (S4), and then, libraries are downloaded, it is possible to reduce effectively a waiting time for download in zapping, and realize a broadcasting reception means capable of pleasant zapping.

Embodiment 3

A description will be given of a broadcasting reception apparatus in accordance with a third embodiment of this invention.

Figure 12:
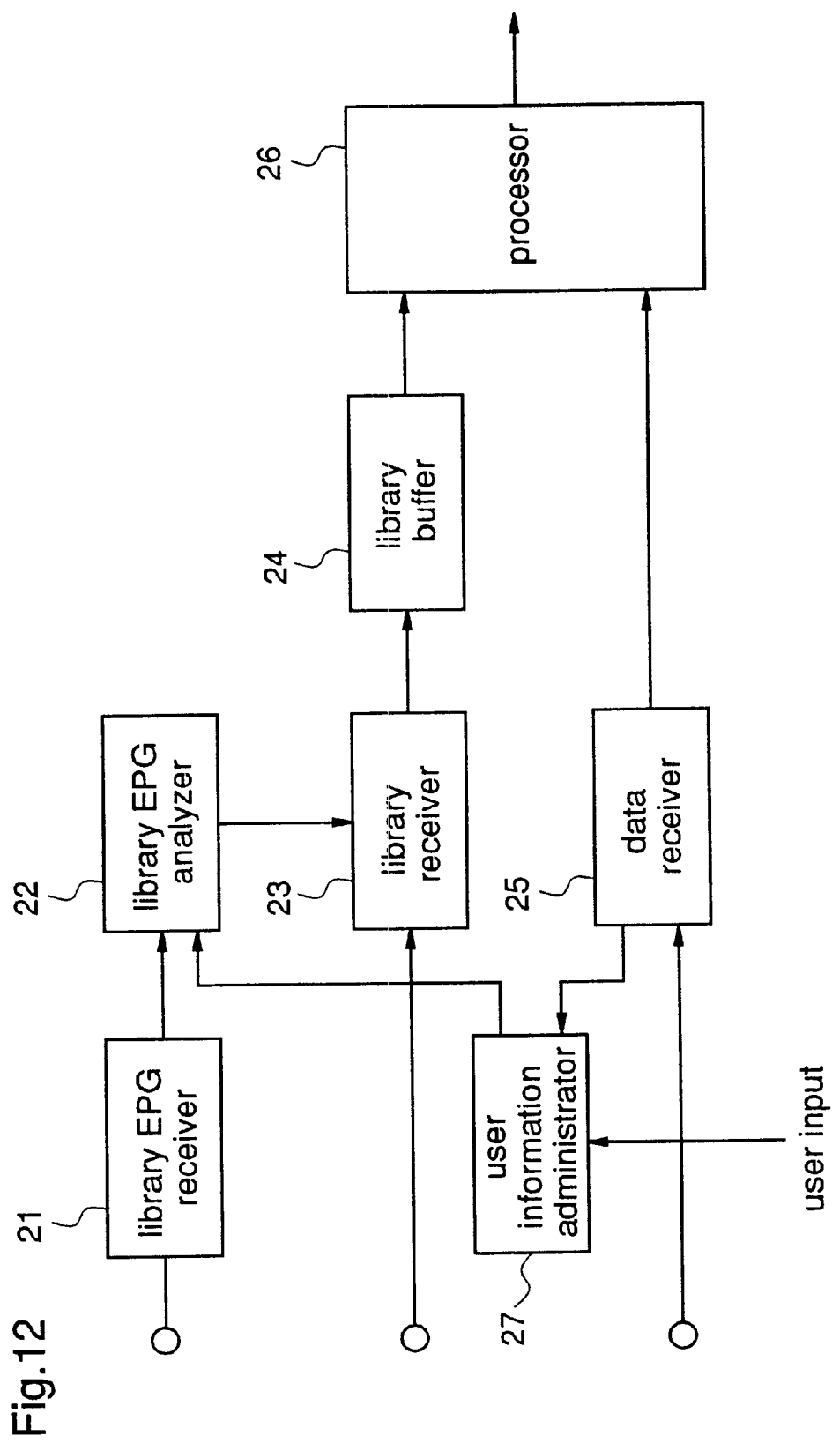
FIG. 12 is a block diagram showing a structure of a broadcasting reception apparatus in accordance with a third embodiment of this invention.

FIG. 12 is a diagram showing the broadcasting reception apparatus. In the figure, the same reference numerals as in FIG. 7 denote identical or corresponding parts. Reference numeral 27 indicates a user information administrator recording a channel number along with date and time of listening to or watching the channel, for example, "listened or watched channel 3 from ○○ o'clock to X X o'clock in Δ day of the week, X day ○ month".

Figure 15:
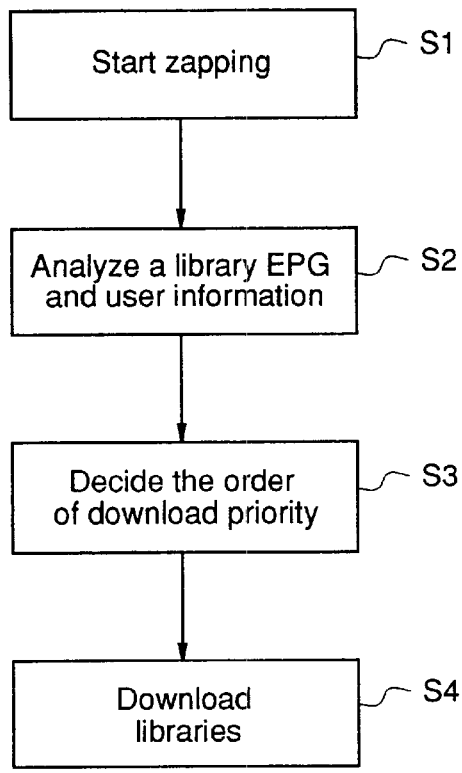
FIG. 15 is a flowchart for explaining the operation of the broadcasting reception apparatus of the third embodiment.

FIG. 15 is a flowchart showing the operation of the broadcasting reception apparatus in zapping.

The operation of the broadcasting reception apparatus will be explained.

In the third embodiment, just as in the second embodiment, a program signal, a decoding software program, and library EPG data are provided.

The library EPG analyzer 22 decides the order of priority of libraries downloaded based on the total audience time for each channel calculated based on information about user's audience accumulated in the user information administrator 27, and the library EPG data indicating a program on which time zone, on which channel is decoded using which decoding software program (library).

Figures 13, 14:
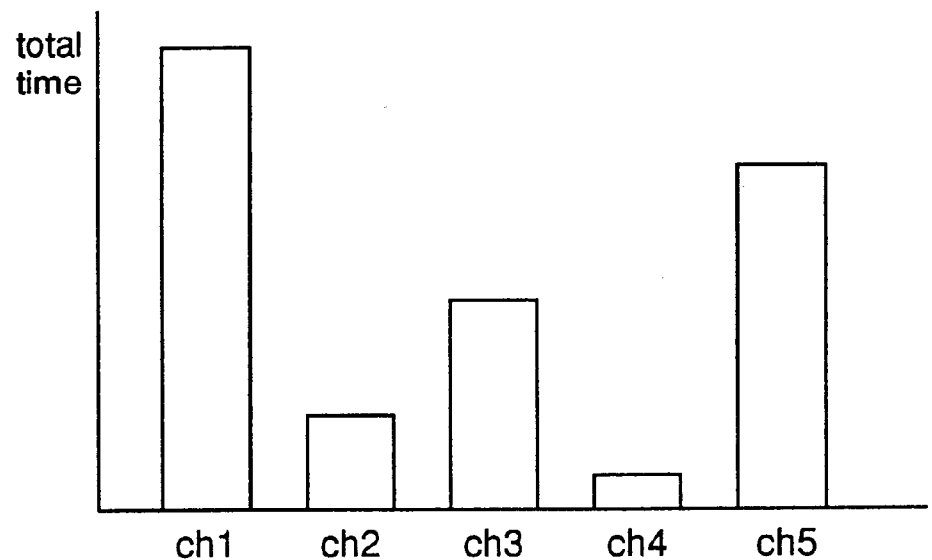
FIG. 13 is a diagram showing an example of user information used in the broadcasting reception apparatus of the third embodiment.
FIG. 14 is a diagram showing another example of user information used in the broadcasting reception apparatus of the third embodiment.

For example, when the library EPG received by the library EPG receiver 21 is as shown in FIG. 10, and zapping starts at time t in FIG. 10 (S1), the library EPG analyzer 22 analyzes the library EPG and the user information (S2), and decides the order of download (S3). That is, libraries needed for decoding the program signal of each channel at time (t+α) when libraries will be actually required for zapping, are detected in the library EPG. Further, the total audience time for each channel within a predetermined past period, for example, the last week, is calculated based on information about user's audience accumulated in the user information administrator 27. The libraries detected in the library EPG are downloaded in order of the total audience time the largest first. Specifically, FIG. 13 shows the total audience time for each channel within a predetermined past period, for example, the last week, calculated based on information about user's audience accumulated in the user information administrator 27. When zapping starts while listening to or watching channel 1 at time t, the operation is as follows. That is, when the total audience time within a predetermined period is as shown in FIG. 13, the order of priority is channel 5, channel 3, channel 2, and channel 4. What library is used in channel 5 is A. Since channel 1 is listened or watched at time t, the library A has been already stored in the buffer. What library is used in channel 3 are A and B. Accordingly, the library B has the first priority for library download. Channel 2 uses the libraries B and D, so the D has the second priority. Therefore, the order of priority is determined to be B→D, and the libraries B and D are fetched in advance, depending on the amount of the buffer.

Thus, in the third embodiment, total audience times for channels within a given constant period are compared to each other, and the order of download priority is determined in such a way as that first for a channel having the largest total audience time a library for decoding broadcast signals on the channel is downloaded. Consequently, especially when the user repeatedly switches and listens or watches, i.e., zaps, his/her several favorite channels, a download waiting time can be reduced in zapping, thereby realizing a broadcasting reception means capable of pleasant zapping.

Although in the third embodiment total audience times for channels within a given constant period are compared to each other, and first for a channel having the largest total audience time a library for decoding broadcast signals on the channel is downloaded, the order of priority may be determined with the number of times of listening to or watching the channel at the same time in the past.

When the order of priority is determined with the number of times of listening to or watching the channel at the same time in the past, if the present time is t, the number of times of listening to or watching for each channel is counted at time t+α yesterday, time t+α 2 days before, and so on, i.e., time t+α in the past. For example, if the number of times of audience is as shown in FIG. 14, the order of channel priority is channel 3→channel 2→channel 1→channel 5→channel 4. FIG. 10 shows a library EPG, in which the libraries used for channel 3 are A and B; channel 2, B and D; channel 1, A; channel 5, A; and channel 4, A. Hence, the order of download priority is B→D. The libraries 5 and D are fetched in advance, depending on the amount of the buffer.

As pointed out above, if the order of priority is determined by the number of times of audience the channel at the same time in the past, the download waiting time is reduced in zapping, thereby realizing a broadcasting reception means capable of pleasant zapping.

Further, in a system in which a genre-categorized program schedule table, in which the genre of each program is described, is provided, the user's favorite genres are predetermined, or estimated from a past audience situation. A channel transmitting the favorite genres is found, and libraries used for the channel may be fetched in advance. In this case, the user information administrator 27 holds and administrates the genre-categorized program schedule table and the user's favorite genres.

As a way of estimating the user's favorite genres, the total times of the user's audience genres in the past are calculated using the genre-categorized program schedule table, and the order of genres are determined by the total time in a way in which the largest is the most favorite.

In determining the order of download priority, genres of programs broadcast at time t+α are searched in the genre-categorized program schedule table, and the order of channel is determined in an manner that a channel transmitting a genre positioning high in the order of genre positions high in the order of channel. A library given priority to download first is determined using the library EPG.

For example, when genres P, Q, R, and S are defined in the genre-categorized program schedule table, it is assumed that the order of audience time in the past is S, R, Q, P, in which the largest is S. When broadcast genres are searched at time t+α using the genre-categorized program schedule table, if it is assumed that contents having a genre S are broadcast on channel 1 and channel 4; a genre R, channel 3; a genre Q, channel 2; and a genre P, channel 5, then the order of channel is channel 1, channel 4, channel 3, channel 2, channel 5. The order of library download priority is B, D, which are fetched in advance at time t, depending on the amount of a buffer.

As described above, if the order of download priority is determined based on the favorite genre, especially when the user frequently listen to or watch, or zap, channels of the favorite genre, the download waiting time is reduced in zapping, thereby making possible a broadcasting reception means capable of pleasant zapping.

Further, in place of that the user information administrator 27 holds and administrates the genre-categorized program schedule table and the user's favorite genre, the library EPG receiver 21 may receive the genre-categorized program schedule table, and the library EPG analyzer 22 may process the genre-categorized program schedule table.

Furthermore, the above-described several ways of determining the order of download priority based on information about the user's switching channels in the past, i.e., the determination of the order of priority based on the total audience time in a given constant period, the determination of the order of priority based on the number of times of audience for each channel at the same time in the past, and the determination of the order of priority based on favorite genres, are simulated, and a way the most suitable for the user may be automatically chosen. This method can fetch in advance the library used most probably.

Further, when a remote control can preset channels which the user mainly watches, the user information administrator 27 may hold information about the preset, and the library EPG analyzer 22 may determine the order of download priority, according to which libraries used for the channels preset in the remote control are first fetched in advance. If the order of priority is determined based on channels preset in a remote control, especially when the user performs zapping with the remote control, it is possible to reduce the download waiting time, thereby realizing a broadcasting reception means capable of pleasant zapping.

Embodiment 4

Figure 18:
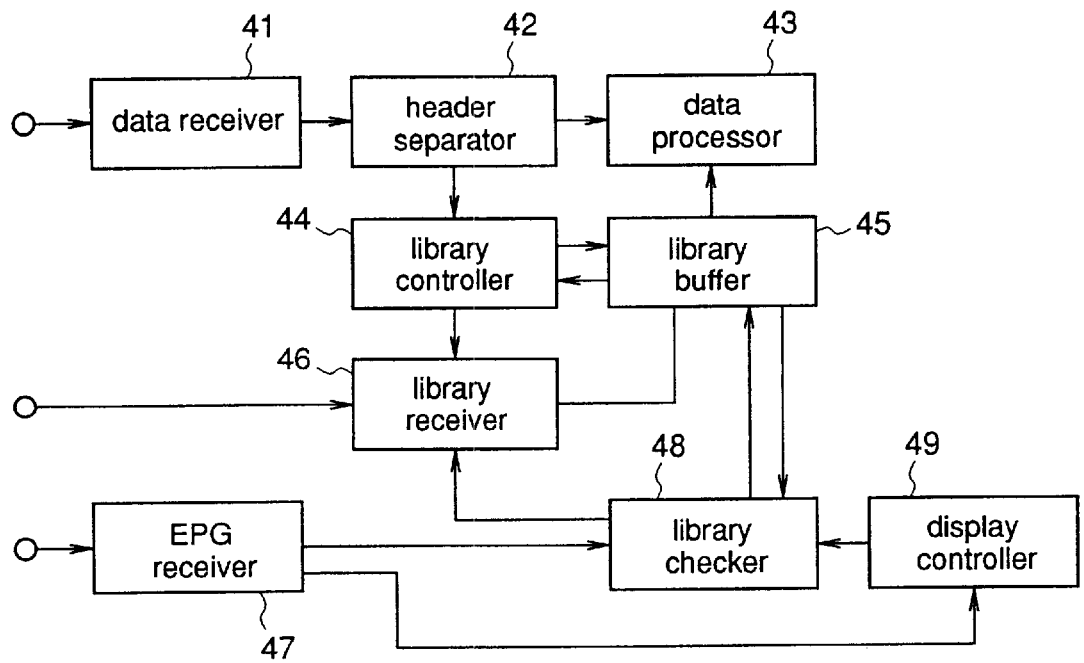
FIG. 18 is a block diagram showing a structure of a broadcasting reception apparatus in accordance with a fourth embodiment of this invention.

FIG. 18 is a diagram showing a structure of a broadcasting reception apparatus in accordance with a fourth embodiment of this invention. In the figure, reference numeral 41 denotes a data receiver receiving broadcast signals of programs (hereinafter referred to as program signals) provided by broadcasters. The program signal comprises a data part and a header part. In the header part, attribute data, such as the name of a decoding software program for decoding the data, is described. 42 it a header separator separating a program signal received in the data receiver 41 into the data part and the header part, outputting the header part to a library controller 44 described hereinafter, and outputting the data part to the data processor 43 described hereinafter. 46 is a library receiver receiving a decoding software program (library) for decoding a program signal, via broadcasting. The library controller 44 detects the name of a library for decoding a program signal from the header part obtained from the header separator 42, and checks whether the library is held in a library buffer or not. 45 is the library buffer holding the library received in the library receive 46. The data processor 43 decodes the data output by the header separator 42 using the library hold in the library buffer 45. 47 is an EPG receiver receiving EPG data used in selecting channels in the broadcasting reception apparatus. In the EPG data, the names of libraries for decoding the program signals on the respective channels are described. 48 is a library checker comparing the name of libraries described in the EPG data with libraries in the library buffer 45. 49 is a display controller controlling the display of an EPG picture on a display screen.

FIG. 22(a) is a flowchart for explaining the operation of the broadcasting reception apparatus in accordance with the fourth embodiment. The operation will be described with reference to FIG. 22(a).

Figure 19:
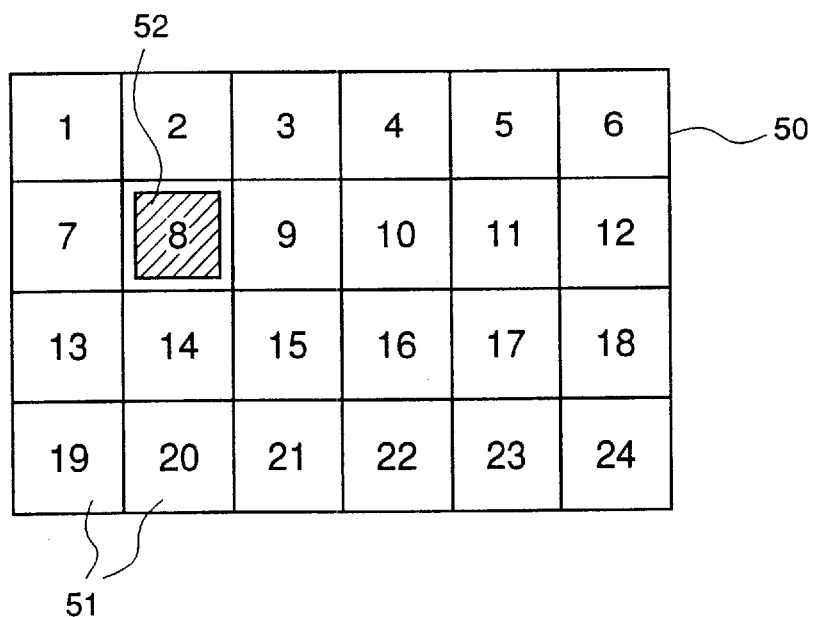
FIG. 19 is a diagram showing an example of displaying an EPG picture.

In the broadcasting reception apparatus, channel selection for receiving signals is performed, for example, using an EPG picture 50 as shown in FIG. 19. When the user controls a remote control to start selecting channels for receiving signals (S1), the display controller 49 presents on a display screen, an EPG picture on which a plurality of cells 51 shown in FIG. 19, corresponding to a plurality of channels, arranged in a matrix based on the EPG data received by the EPG receiver 47. A cursor 52 is also displayed on the EPG picture 50 to indicate a cell. In FIG. 19, the cursor 52 is indicating channel 8.

Although in FIG. 19 only a channel number is presented in the cell 51, information about a program being broadcast at the present time as well as the channel number may be displayed in the cell 51.

The display controller 49 detects which cell is detected by the cursor (S2), and outputs this information to the library checker 48. The library checker 48, based on information about which cell is indicated by the cursor, detects the names of libraries for decoding program data on channels shown in a cell indicated by the cursor and its adjacent cells, i.e., in FIG. 19 a cell of channel 8 and its adjacent channels of eight channel 1, 2, 3, 7, 9, 13, 14, and 15 (S3). Thereafter, the library checker 48 checks whether those libraries are held in the library buffer 45 or not (S4). When the library is not held in the library buffer 45, the library checker 48 controls the library receiver 46 in a way to receive the library. In response to control of the library checker 48, the library receiver 46 downloads the library not held in the library buffer 45 (S5), and stores it in the library buffer 45.

In the EPG picture 50 on which a plurality of cells corresponding to a plurality of channels, arranged in a matrix, receiving channels are selected by a cursor shifting cell by cell in a way that pushing one of a plurality of input keys 60 of a remote control, indicating directions of shifting a cursor, i.e., up, down, left, right, and slant directions, shifts a cursor from a cell to one of its adjacent cells positioning in the direction indicated by a pushed key. For example, as shown in FIG. 19, when the cursor 52 is at the position of channel 8, the cursor 52 can move to eight cells 51 of channel 1, 2, 3, 7, 9, 13, 14, and 15 by pushing the input key one time. That is, when the cursor positions the cell of channel 8, it is highly probable that the cursor shifts to one of those eight cells, and the channel indicated by the cell that the cursor has shifted is chosen. In the broadcasting reception apparatus, as described above, a cell indicated by a cursor is detected on an EPG picture. It is checked whether libraries used for channels indicated by the cell and its adjacent cells are held in a library buffer or not. When not held, the library is downloaded via broadcasting to be stored in the library buffer. Thus, the library that is used in a channel to be highly probably chosen, and that is not held in the library buffer is downloaded before selection of receiving channels. Therefore, the download waiting time is reduced in a broadcasting reception apparatus in which channel selection is performed using EPG.

As hereinbefore described, in the broadcasting reception apparatus in accordance with the fourth embodiment, receiving channel selection is performed by choosing one of a plurality of cells on an EPG picture on which the plurality of cells corresponding to a plurality of channels are arranged in a matrix, using a cursor shifting from one cell to its adjacent cell by one operation of a remote control. It is decided whether a library buffer stores decoding software programs for decoding programs transmitted via channels shown in a cell indicated by the cursor and its adjacent cells. When not held, the decoding software program is download via broadcasting, and stored in the library buffer. Consequently, the download waiting time can be reduced in a broadcasting reception apparatus in which channel selection is performed using EPG.

In the description of the fourth embodiment, the name of a library for decoding program data on each channel is described in EPG data, and the library checker 48 detects from EPG data the names of libraries used for decoding program data on channels shown in a cell indicated by a cursor and its adjacent cells, based on information about which cell is indicated by the cursor. However, when the name of a library for decoding program data on each channel is not described in the EPG data, the data receiver 41, based on the information about which cell is indicated by a cursor, successively switches channels shown in a cell indicated by a cursor and its adjacent cells, and receives the channels, the header separator 42 extracts the header part of a program signal on each channel, and outputs it to the library controller 44, the library controller 44 reads the header part of a program signal on each channel to detect the name of a library for decoding the program signal data, and checks whether the library is held in the library buffer 45 or not, and when the library is not held in the library buffer 45, controls the library receiver 46 in a way to receive the library not held in the library buffer 45.

Further, in the fourth embodiment, the cells showing channels are arranged on the EPG picture in a 6×4 matrix. However, an EPG picture may be one in which the cells showing channels are arranged on the EPG picture in an m×n matrix (m and n are positive integers).

Embodiment 5

In the broadcasting reception apparatus according to the fourth embodiment, a cursor position is detected on an EPG picture. For all channels shown in a cell indicated by the cursor and its adjacent cells, libraries used for those channels are held in a library buffer or not. When not held, the library is download via broadcasting. However, in a broadcasting reception apparatus in accordance with a fifth embodiment, the motion of a cursor is detected on an EPG picture. For a cell to which the cursor shifted, its adjacent cell positioning in the shifting direction, and cells adjacent to the first and second cells, it is checked whether the libraries used for channels shown in those cells are held or not. When not held, the library is downloaded via broadcasting.

Figure 22:
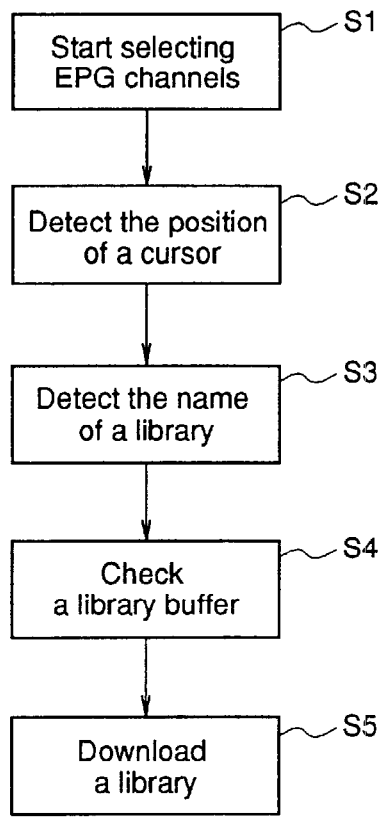
FIG. 22 is a flowchart for explaining the operation of the fourth and fifth embodiments.
Figure 22:
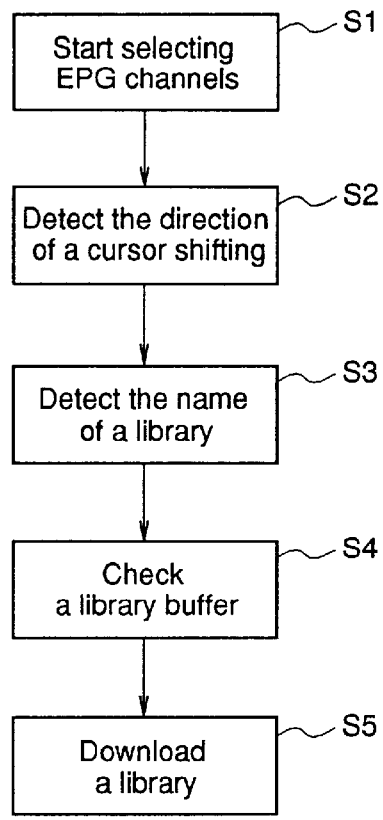

A structure of the broadcasting reception apparatus according to the fifth embodiment is similar to that of the broadcasting reception apparatus according to the fourth embodiment shown in FIG. 18. FIG. 22(*b*) is a flowchart for explaining the operation of the broadcasting receptor apparatus according to the fifth embodiment. The operation of the broadcasting reception apparatus according to the fifth embodiment will be described with reference to FIG. 22(*b*).

Figure 21:
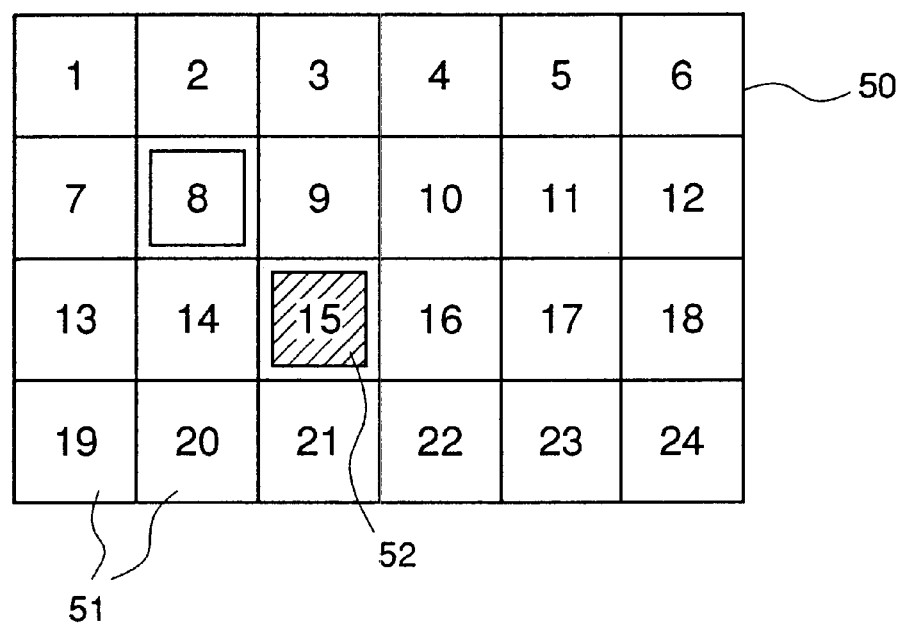
FIG. 21 is a diagram for explaining the operation of a broadcasting reception apparatus in accordance with a fifth embodiment of this invention.

In the broadcasting reception apparatus, when the user controls a remote control to start selection channels for receiving signals (S1), the display controller 49 presents on a display screen, an EPG picture 50 on which a plurality of cells shown in FIG. 21, corresponding to a plurality of channels, arranged in a matrix. A cursor 52 is also displayed on the EPG picture 50 to indicate a cell.

Figure 20:
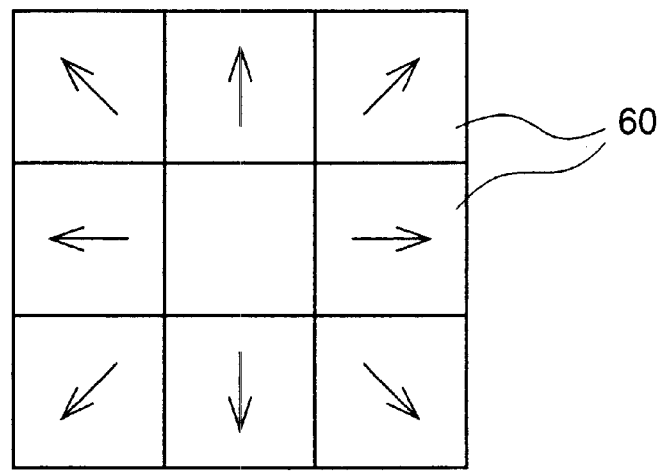
FIG. 20 is a diagram showing an example of input keys of a remote control for selecting channels using the EPG picture shown in FIG. 19.

The user shifts the cursor 52 displayed on the EPG picture 50 using a remote control including, for example, input keys 60 shown in FIG. 20. It is assumed that the cursor, which has been positioned at a cell showing channel 8 in an initial state in selecting receiving channels, shifts to a cell showing channel 15 by operation of the remote control, as shown in FIG. 21. The display controller 49 detects a cell to which the cursor shifts and the direction of the cursor shifting (here right bottom) (S2), and outputs this information to the library checker 48. The library checker 48, based on the information from the display controller 49, detects from EPG data the names of libraries used for decoding program data on channels shown the cell to which the cursor shifts (cell showing channel 15), its adjacent cell positioning in the shifting direction (cell showing channel 22), and cells adjacent to the first and second cells (cells showing channel 16 and 21). Thereafter, the library checker 48 checks whether the libraries used for channels shown in those cells are held or not (S4). When the library is not held in the library buffer, the library checker 48 controls the library receiver 46 in a way to receive the library via broadcasting. The library receiver 46 downloads the library not held in the library buffer 45 in response to the control of the library checker 48, and stores the library in the library buffer 45.

On the EPG picture 50 on which a plurality of a plurality of cells 51 corresponding to channels shown in FIG. 21 are arranged in a matrix, receiving channels are selected by a cursor shifting cell by cell in a way that pushing one of a plurality of input keys 60 of a remote control, indicating the direction of shifting a cursor, i.e., up, down, left, right, and slant directions, shifts a cursor from a cell to one of its adjacent cells positioning in the direction indicated by a pushed key. For example, as shown in FIG. 21, when the cursor 52 shifts from a cell showing channel 8 to a cell showing channel 15 by the user controlling the remote control, the cursor 52 can move to eight cells of channel 8, 9, 10, 14, 16, 20, 21, and 22 by pushing an input key next one time. Taking it into account that the cursor has shifted from channel 8 to channel 15, it is seemingly little probable that the cursor shifts back to channel 8. It is also considered little probable that the cursor shifts to channel 9 or 14, because if the user wants to switch to channel 9 or 14, it is better to shift the cursor directly from channel 8 to channel 9 or 14. Further, if shifting to channel 10, the cursor would move from channel 8 to channel 9 to channel 10. If shifting to channel 20, the cursor would move from channel 8 to channel 14 to channel 20. Thus, it seems to be little probable that the cursor shifts from channel 8 to channel 10 or 20. In other words, when the cursor has shifted from channel 8 to channel 15, it is highly probable that the cursor will shift next time to, among cells adjacent to the cell showing channel 15, an adjacent cell positioning in the shifting direction (cell showing channel 22), or cells adjacent to the cells showing channel 15 and 22 (cells showing channel 16 and 21). In the broadcasting reception apparatus in accordance with the fifth embodiment, as described above, the mention at a cursor is detected on an EPG picture. For a cell to which the cursor shifted, its adjacent cell positioning in the shifting direction, and cells adjacent to the first and second cells, it is checked whether the libraries used for channels shown in those cells are held or not. When not held, the library is downloaded via broadcasting, and stored in a library buffer. Therefore, the download of libraries, which are used on channels being highly probable to be selected, and are not held in a library buffer, is started before selecting the channels. Thus, the download waiting time is reduced using EPG in a broadcasting reception apparatus in which channel selection is performed.

As described above, in the broadcasting reception apparatus in accordance with the fifth embodiment, receiving channel selection is performed by choosing one of a plurality of cells on an EPG picture on which the plurality of cells corresponding to a plurality of channels are arranged in a matrix, using a cursor shifting from one cell to its adjacent cell by one operation of a remote control. For a cell to which the cursor shifted, its adjacent cell positioning in the shifting direction, and cells adjacent to the first and second cells, it is checked whether decoding software programs used for decoding programs broadcast via channels shown in those cells are held or not. When not held, the library is downloaded via broadcasting, and stored in a library buffer. Thus, the download waiting time is reduced using EPG in a broadcasting reception apparatus in which channel selection is performed.

In the description of the fifth embodiment, the name of a library for decoding program data on each channel is described in EPG data, and the library checker 48 detects from EPG data the names of libraries used for decoding program data on channels shown in a cell indicated by a cursor and its adjacent cells, based on information about which cell is indicated by the cursor. However, when the name of a library for decoding program data on each channel is not described in the EPG data, the data receiver 41, based on the information about which cell is indicated by a cursor, successively switches channels shown in a cell to which the cursor shifted, its adjacent cell positioning in the shifting direction, and cells adjacent to the first and second cells, and receives the channels, the header separator 42 extracts the header part of a program signal on each channel, and outputs it to the library controller 44, the library controller 44 reads the header part of a program signal on each channel to detect the name of a library for decoding the program signal data, and checks whether the library is held in the library buffer 45 or not, and when the library is not held in the library buffer 45, controls the library receiver 46 in a way to receive the library not held in the library buffer 45.

Further, in the fifth embodiment, the cells showing channels are arranged on the EPG picture in a 6×4 matrix. However, an EPG picture may be one in which the cells showing channels are arranged on the EPG picture in an m×n matrix (m and n are positive integers).

Embodiment 6

FIG. 23 is a diagram showing an example of an EPG picture presented on display screen by a broadcasting reception apparatus in accordance with a sixth embodiment of this invention.

As is pointed out in the figure, the broadcasting reception apparatus presents channels in such a manner as that channels using the same library cluster on the EPG picture.

A structure of the broadcasting reception apparatus according to the sixth embodiment is similar to that of the broadcasting reception apparatus according to the fourth embodiment.

In the broadcasting reception apparatus according to the sixth embodiment, when the name of a library for decoding program data on each channel is described in EPG data received by the EPG receiver 47, the display controller 49 detects a library used for each channel from the EPG data, and displays channels in a manner in which channels using the same library cluster on the EPG picture, just as in FIG. 23. When the name of a library for decoding program data on each channel is not described in the EPG data, the data receiver 41 successively switches and receives all the channels, the header separator 42 extracts the header part of a program signal on each channel, and outputs it to the library controller 44, the library controller 44 reads the header part of a program signal on each channel to detect the name of a library for decoding the program signal data. The display controller 49, based on a result of the direction, performs display control in a way that channels using the same library cluster on the EPG picture, and displays the EPG picture as shown in FIG. 23 on the display screen.

In the thus-described sixth embodiment, channels using the same library are clustered together on an EPG picture. Consequently, when channels are selected on the EPG picture, after a channel is chosen and the library for the channel is downloaded, the download waiting time is unnecessary when choosing channels neighboring the selected channel, using the same library, thereby realizing pleasant channel selection for the user.

Embodiment 7

Figure 24:
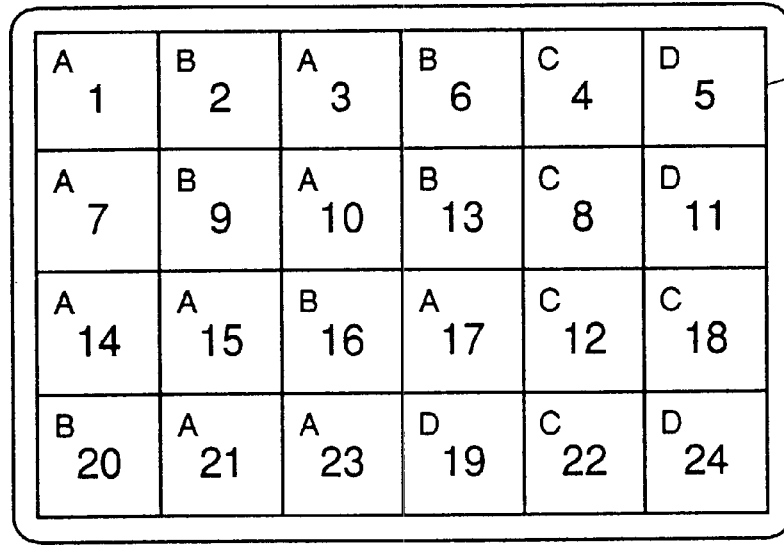
FIG. 24 is a diagram showing an example of an EPG picture displayed by a broadcasting reception apparatus in accordance with a seventh embodiment of this invention.

FIG. 24 is a diagram showing an example of an EPG picture presented on a display screen by a broadcasting reception apparatus in accordance with a seventh embodiment of this invention.

As is pointed out in the figure, the broadcasting reception apparatus presents channels in such a manner as that channels using the same library cluster on the EPG picture.

A structure of the broadcasting reception apparatus according to the seventh embodiment is similar to that of the broadcasting reception apparatus according to the fourth embodiment shown in FIG. 18.

In the broadcasting reception apparatus according to the seventh embodiment, when the name of a library for decoding program data on each channel is described in EPG data received by the EPG receiver 47, the library checker 48 detects the library used for each channel from the EPG data, compares it to libraries held in the library buffer 45, and informs channels using the libraries held in the library buffer 45 to the display controller 49. The display controller 49, based on the information from the library checker 48, displays the channels using the libraries held in the library buffer 45 in a manner in which channels using the same library cluster on the EPG picture, just as in FIG. 24. FIG. 24 is an example when only libraries A and B among libraries A to D are held in the library buffer 45. As is apparent from the figure, channels using the libraries A and B are clustered together on the left side of the EPG picture.

When the name of a library for decoding program data on each channel is not described in the EPG data, the data receiver 41 successively switches and receives all the channels, the header separator 42 extracts the header part of a program signal on each channel, and outputs it to the library controller 44, the library controller 44 reads the header part of a program signal on each channel to detect the name of a library for decoding the program signal data, and compares the detected library to libraries held in the library buffer 45, and informs channels using the libraries held in the library buffer 45 to the display controller 49. The display controller 49, based on the information from the library controller 44, performs display control in a way that channels using the same library cluster on the EPG picture.

In the thus-described seventh embodiment, channels using the same library, i.e., channels not needing library download when selected, are clustered together on an EPG picture. Consequently, for channels in this cluster on the EPG picture, the download waiting time is unnecessary, thereby realizing pleasant channel selection for the user. As to channels using libraries not held in the library buffer 45, if adopting the structure of the fourth or fifth embodiment, the download waiting time can be reduced or removed at all in selecting channels.

Embodiment 8

In the fourth and fifth embodiments, a plurality of cells corresponding to a plurality of channels are arranged on an EPG picture in an m×n matrix (m and n are natural numbers), and cells are selected by a cursor which can shift from a cell to one of its adjacent cells, i.e., one by one, in response to one action of operation of a remote control. In a broadcasting reception apparatus in accordance with an eighth embodiment, a plurality of cells corresponding to a plurality of channels are recursively arranged on an EPG picture in an m×n matrix (m and n are natural numbers), and a remote control has input keys arranged in an m×n matrix. Channels are selected in the following way. Cells including a desired channel are continually selected one time less than the number of recurring times of cell arrangement until only a minimum unit of m×n matrix is shown on the EPG picture. Then, an input key corresponding to the cell showing the desired channel is chosen.

A structure of the broadcasting reception apparatus according to the eighth embodiment is similar to that of the broadcasting reception apparatus according to the fourth embodiment.

Figure 25:
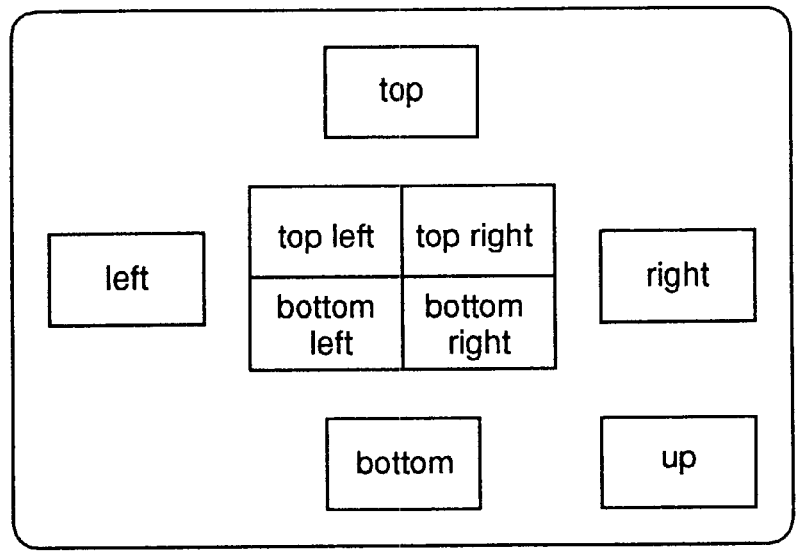
FIG. 25 is a diagram showing an example of input keys of a remote control used in a broadcasting reception apparatus in accordance with an eighth embodiment of this invention.

FIG. 25 is a diagram illustrating a structure of input keys of the remote control used for channel selection in the broadcasting reception apparatus of the eighth embodiment. The remote control is used for operating EPG as shown in FIG. 26. The user pushes either of input keys arranged in the center portion of the remote control, i.e., 'top left', 'top right', 'bottom left' and 'bottom right'. These input keys indicate the positions of divisions when the display screen is divided into four. In a situation when the EPG picture shown in FIG. 26 is displayed, pushing the 'top left' key leads to the selection of the top left portion of FIG. 26. At the time, the portion is made noticeable to represent that it is being selected, for example, by changing the color of the portion on the EPG picture. In this situation, if a 'select' key (not shown) is pushed, the display screen switches to that shown in FIG. 27. Similarly, in the situation that the EPG picture in FIG. 26 is presented, to push the 'top right' key selects the top right portion of FIG. 26, and to push the 'select' key switches the screen to that shown in FIG. 28; to push the 'bottom left' key selects the bottom left portion of FIG. 26, and to push the 'select' key switches the screen to that shown in FIG. 29; and to push the 'bottom right' key selects the bottom right portion of FIG. 26, and to push the 'select' key switches the screen to that shown in FIG. 30. The remote control further includes 'top', 'bottom', 'left' and 'right' input keys to change selection ranges. For example, in the situation that the EPG picture in FIG. 26 is presented, when the 'top left' key is pushed, the top left portion of the EPG picture in FIG. 26 becomes the selection range. In this situation, pushing the 'bottom' key makes the bottom left portion of the EPG picture the selection range. Then, pushing the 'right' key makes the bottom right portion the selection range. Then, pushing the 'top' key makes the top right portion the selection range. Then, pushing the 'left' key makes the top left portion the selection range. The remote control further include an 'up' key. When pushing the 'up' key, the state is one stage up in the hierarchy. For example, in the situation that the EPG picture in FIG. 26 is presented, pushing the 'up' key leads to display of an EPG picture as shown in FIG. 31. When one of EPG pictures of FIGS. 27 to 30 is presented, if the 'up' key is pushed, the EPG picture shown in FIG. 26 is displayed.

For example, in the situation that the EPG picture in FIG. 27 is presented, the 'top left' input key of the remote control corresponds to channel 1; the 'top right', channel 2, the 'bottom left', channel 5; and the 'bottom right', channel 6. Pushing either of the keys, a channel corresponding to it is selected.

In a case of using the EPG of such a selection method, when channels are finally selected, the number of choices is always four. In the broadcasting reception apparatus of the eighth embodiment, EPG pictures are selected by a remote control. At the time when either of the EPG pictures is presented, it is checked whether decoding software programs for decoding programs transmitted via the four channels shown in the EPG picture are held or not. When not held, the decoding software program is downloaded via broadcasting, and stored in the library buffer.

To be specific, when the name of a library for decoding program data on each channel is described in EPG data received by the EPG receiver 47, if, for example, FIG. 27 is presented as a final selection picture, the display controller 49 informs the library checker 48 about channels contained in the EPG picture, i.e., channel 1, channel 2, channel 5, and channel 6. The library checker 48 detects the library used for each channel from the EPG data. When the library is not held in the library buffer 45, the library checker 48 controls the library receiver in a way to receive the library. In response to the control of the library checker 48, the library receiver 46 downloads the library not held in the library buffer 45 via broadcasting, and stores the library in the library buffer 45.

When the name of a library for decoding program data on each channel is not described in the EPG data, if, for example, FIG. 27 is presented as a final selection picture, the display controller 49 informs the data receiver 41 about channels contained in the EPG picture, i.e., channel 1, channel 2, channel 5, and channel 6. The data receiver 41 successively switches and receives all the channels, the header separator 42 extracts the header part of a program signal on each channel, and outputs it to the library controller 44, the library controller 44 reads the header part of a program signal on each channel to detect the name of a library for decoding the program signal data, and checks whether the library is held in the library buffer 45 or not. When the library is not held, the library controller 44 controls the library receiver in a way to receive the library.

As described above, at the time when the EPG picture for final selection is presented, libraries for decoding program data on channels shown on the EPG picture are fetched Thus, the download of libraries which are used for channels to be finally selected and are not held in a library buffer is started before selecting receiving channels. Thereby, the download waiting time can be reduced for a broadcasting reception apparatus performing channel selection using EPG.

Thus, the broadcasting reception apparatus in accordance with the eighth embodiment receives broadcast signals transmitted according to a data broadcasting method sending program signals of two or more kinds of broadcasting formats via a plurality of channels, in which a plurality of cells corresponding to a plurality of channels are recursively arranged on an EPG picture in a 2×2 matrix, and a remote control has input keys arranged in a 2×2 matrix. Channels are selected in the following way. Cells including a desired channel are continually selected one time less than the number of recurring times of cell arrangement until only a minimum unit of 2×2 matrix is shown on the EPG picture. Then, an input key corresponding to the cell showing the desired channel is chosen. At the time when cells including a desired channel are continually selected one time less than the number of recurring times of cell arrangement, it is checked whether decoding software programs for decoding programs transmitted via channels shown in cells in a minimum unit of 2×2 matrix. If the library is not held in a library buffer, the library is downloaded. As a result, the download waiting time can be reduced in a broadcasting reception apparatus performing channel selection.

In the eighth embodiment, a plurality of cells corresponding to a plurality of channels are recursively arranged on an EPG picture in a 2×2 matrix, and a remote control has input keys arranged in a 2×2 matrix. Channels are selected in the following way. Cells including a desired channel are continually selected one time less than the number of recurring times of cell arrangement until only a minimum unit of 2×2 matrix is shown on the EPG picture. Then, an input key corresponding to the cell showing the desired channel is chosen. However, the following modification is within the scope of this invention. A plurality of cells corresponding to a plurality of channels are recursively arranged on an EPG picture in an m×n matrix (m and n are natural numbers), and a remote control has input keys arranged in an m×n matrix. Channels are selected in the following way. Cells including a desired channel are continually selected one time less than the number of recurring times of cell arrangement until only a minimum unit of m×n matrix is shown on the EPG picture. Then, an input key corresponding to the cell showing the desired channel is chosen.

Embodiment 9

Figures 32, 33, 34, 35:
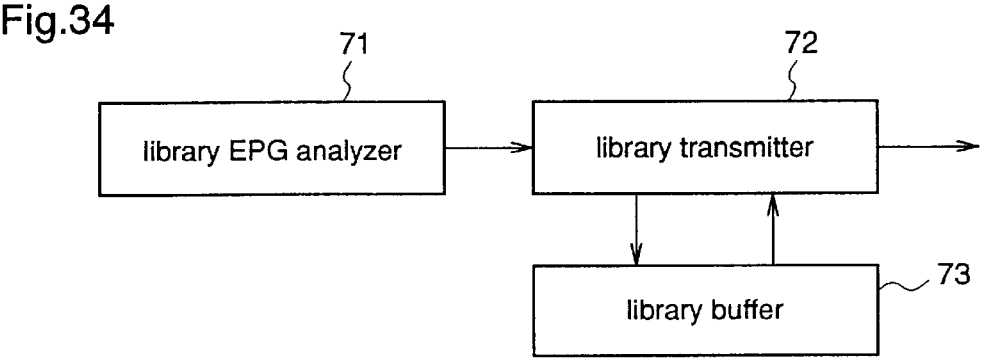
FIG. 32 is a diagram showing a library EPG used in a data broadcasting method in accordance with a ninth embodiment of this invention.
FIG. 33 is a diagram showing how libraries are provided in the data broadcasting method of the ninth embodiment.
FIG. 34 is a diagram a system structure of a broadcaster realizing the data broadcasting method of the ninth embodiment.
FIG. 35 is a diagram for explaining the operation determining the order of providing libraries in the data broadcasting method of this invention.

FIG. 34 is a diagram showing a system structure of a broadcaster realizing a data broadcasting method in accordance with a ninth embodiment. In the figure, reference numeral 71 designates a library EPG analyzer receiving a library EPG showing, for each channel, decoding software programs (libraries) necessary for decoding program signals transmitted by each sub-broadcasters, and analyzing the contents of the library EPG by handling it as a list. 73 is a library buffer holding a plurality of libraries. 72 is a library transmitter outputting the plurality of libraries held in the library buffer 73 in a predetermined order and incidence, based on a result of the analysis.

A broadcaster comprising broadcasting satellites and so on receives broadcast signals from sub-broadcasters each having one or plural channels, and after processing the received broadcast signals, transmits the processed broadcast signals to household receiving terminals. In this case, each of the sub-broadcasters transmit a library EPG data as information showing decoding software programs (libraries), necessary for decoding program signals transmitted by their own, on a time axis for each channel. The library EPG analyzer 71 included in the broadcasting system of the broadcaster receives the library EPG data transmitted by each sub-broadcaster, totals up the data to make a list, for example, as shown in FIG. 32, and, based on the list, determines the order and incidence of libraries held in the library buffer 73 to be transmitted.

For instance, in the list of necessary libraries in FIG. 32, assuming that the present time is t, necessary libraries for channel 1 to channel 5 at the time (t+α) regarded as when the user actually needs libraries, are A, B, B, A, and A, respectively. The library EPG analyzer 71 counts the number of necessary libraries at the specific time (t+α), and controls the library transmitter 72 in a way to provide libraries so that the number of programs using the library matches the number of transmitting the library. The library transmitter 72 uses a library exclusive channel apart from channels for transmitting programs, and, for example, as shown in FIG. 33, provides each library in a way that the number of the provided library is proportional to the number of programs to be decoded with the library.

If there are many programs using a certain library, in general the receiver highly probably selects the programs using the library, that is, it is highly probable that the receiver needs to download the library. Therefore, if the number of each library provided is made proportional to the number of programs using the library, actually transmitted, a library which the receiver highly probably needs is provided with a high incidence. Hence, the download waiting time on the receiving side is effectively reduced.

As described above, according to the data broadcasting method of the ninth embodiment, libraries are provided in a way that the number of each library provided via a library exclusive channel is proportional to the number of programs to be decoded with the library, actually transmitted. Therefore, a library which is highly probably downloaded is provided with a high incidence. Hence, the download waiting time on the receiving side is reduced. Particularly, smooth zapping can be realized on the receiving side.

Figure 36:
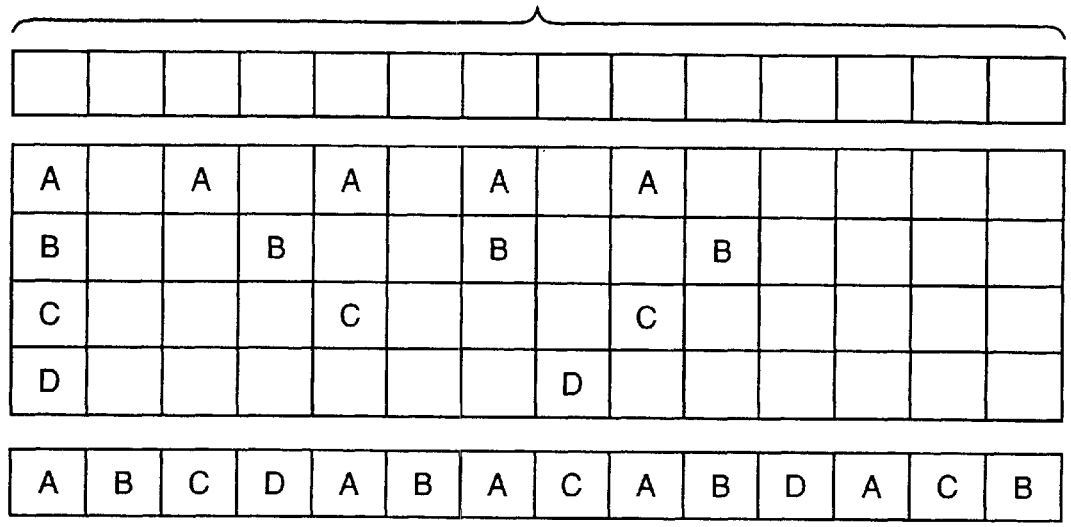
FIG. 36 is a diagram for explaining the operation determining the order of providing libraries in the data broadcasting method of this invention.

In the ninth embodiment, the number of a library provided is proportional to the number of programs using the library. However, in addition to the determination of the number of a library provided (the number of transmission for short), the order of libraries transmitted (the transmission order for short) may be determined based on a predetermined rule, and provided. A description will be given of an example of when both the number of transmission and the transmission order are determined based on the library EPG data. When, for example, the number of programs using each library is counted on the list of the library EPG, as shown in FIG. 35, the library EPG analyzer 71 determines the number of transmission and the transmission order for libraries according to a method as shown in FIG. 36. Initially, in FIG. 35, the total number of libraries is 14, so fourteen frames are arranged in a row (uppermost row). As to the number of each library is 5 for A; 4 for B; 3 for C; and 2 for D. Four rows of frames are prepared in the center portion of FIG. 36, successively corresponding to A, B, C, and D in a way that the uppermost row is for A. The total number 14 is divided by the number of each library. Every the quotient number of frames, each library is put into a frame. In case of the library A, 14 divided by 5 is 2.8 with a remainder 2, and then, as shown in FIG. 36, A is arranged every two frames in the uppermost row of the center portion. In case of the library B, 14/4=3.2 with 3, so B is put every three frames in the second row. In case of the library C, 14/3=4.6 with 4, so C is arranged every four frames in the third row. In case of the library D, 14/2=7 with 7, so D is put every seven frames in the fourth row. Afterwards, the four rows in the center portion of FIG. 36 is scanned from top to bottom and from the top left frame moving to the right. Found libraries are successively put into 14 frames at the lowermost row. Thus, the transmission order of each library is determined.

By providing libraries distributed depending on the number of transmission, a period from the last transmission of a library to the next transmission of the same library is reduced compared with the case where each library is continually transmitted when the number of transmission of the library is proportional to the number of programs using the library. Therefore, the download waiting time of a library can be reduced on the receiving side.

Next, a method of providing libraries when a plurality of sub-library components constitute each library, will be described.

Figure 37:
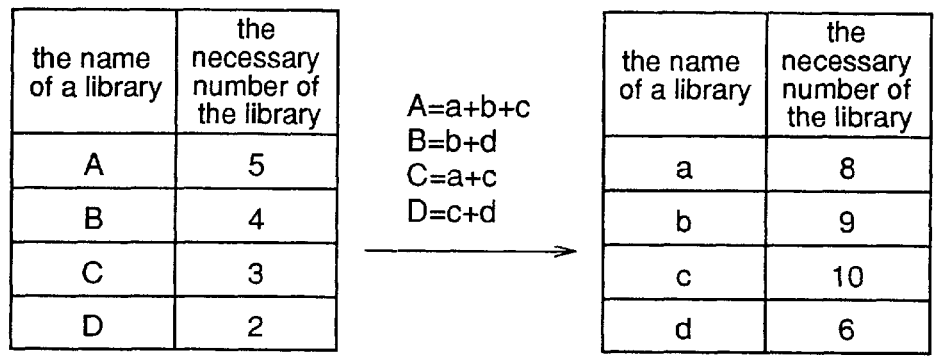
FIG. 37 is a diagram for explaining the operation of the data broadcasting method of this invention when each library comprises sub-library components.
Figure 38:
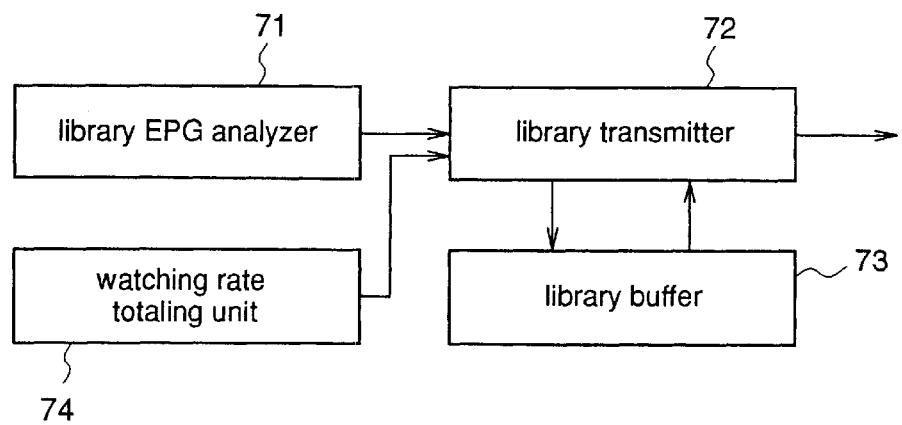
FIG. 38 is a diagram showing a system structure of a broadcaster realizing a data broadcasting method in accordance with a tenth embodiment of this invention.
Figure 41:
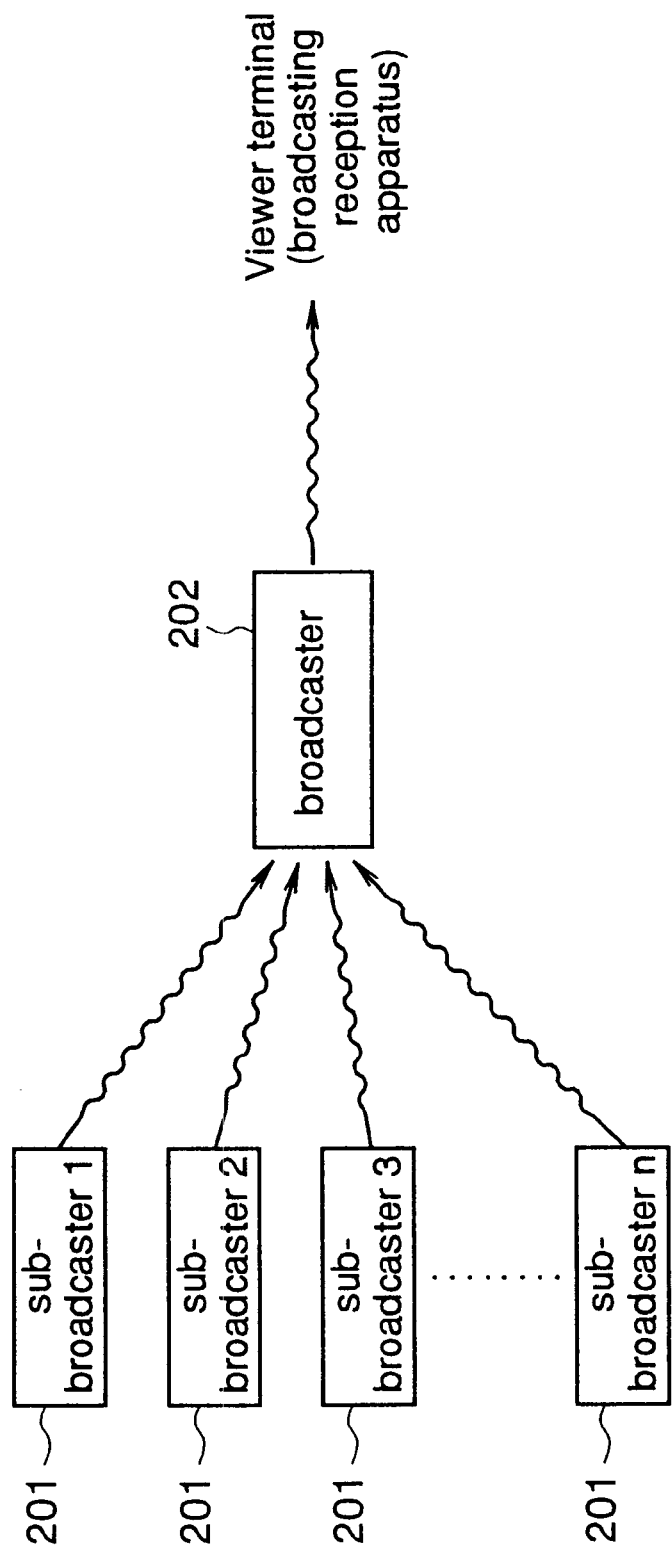
FIG. 41 is a diagram showing a structure of a broadcasting system using a broadcasting satellite.
Figure 42:
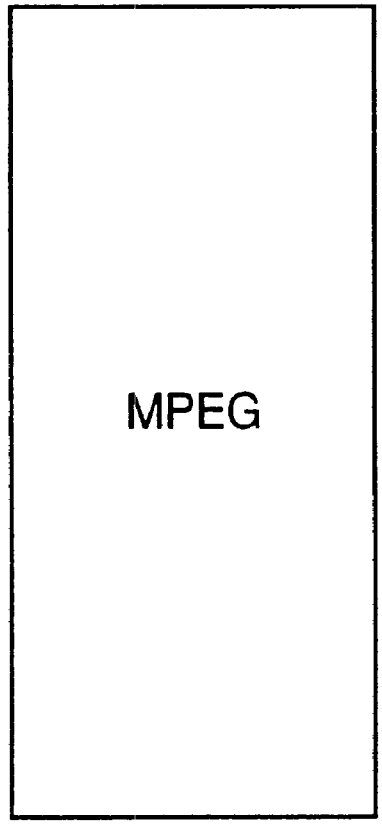
FIG. 42 is a diagram showing an example of data broadcast by a sub-broadcaster, and a display screen of a broadcasting reception apparatus having received the data, in a prior art.
Figure 42:
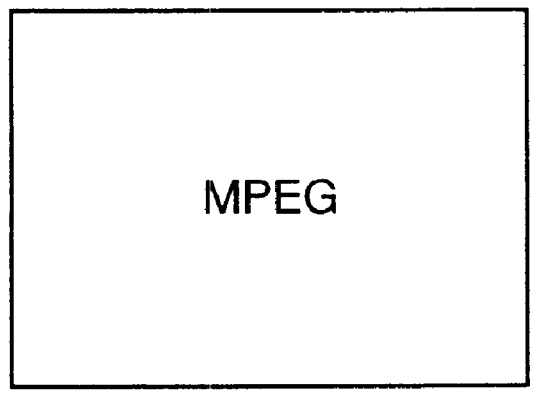
Figure 43:
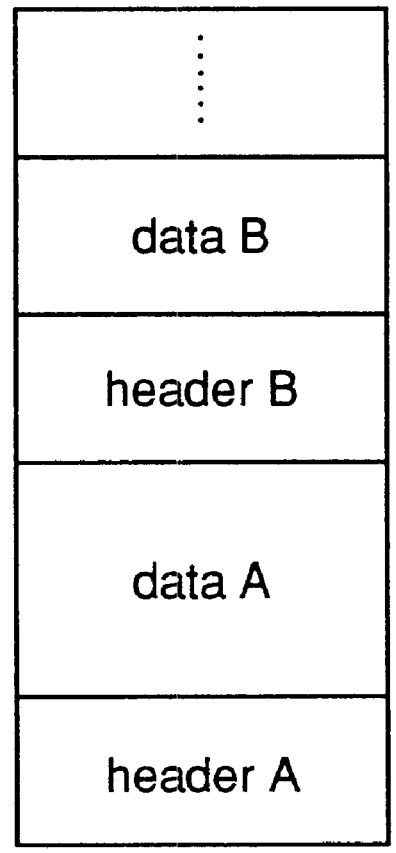
FIG. 43 is d diagram showing an example of data broadcast by a sub-broadcaster, and a display screen of a broadcasting reception apparatus having received the data, in a broadcasting system using signal processing by software.
Figure 43:
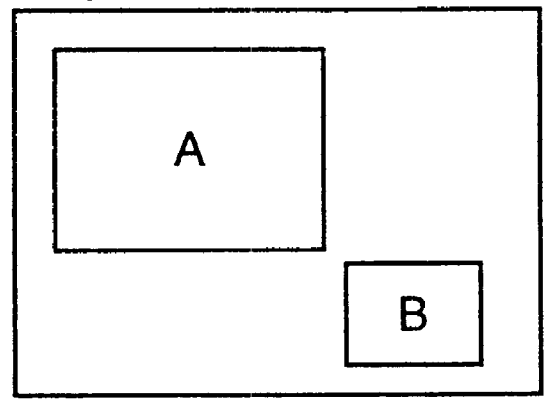

For example, components a, b, and c constitute a library A. Components b and d constitute a library B. Components a and c constitute a library C. Components c and d constitute a library D. Further, as shown in FIG. 37, the number of libraries is 5 for A; 4 for B; 3 for C; and 2 for D. Then, the number of each component is 8 for a; 9 for b; 10 for c; and 6 for d. In this situation, each component is provided with the ration of the number of transmission, i.e., 8:9:10:6. Further, for example, if the components are distributed in the method shown in FIG. 5, the components of the library to be highly probably downloaded are provided with a high incidence, so the library download waiting time can be reduced in zapping on the receiving side.

In this case, information about what components constitute a library is necessary for the receiver to download components. As to a method of providing the information, for example, that components a, b, and c constitute a library A, the information may be transmitted via a library exclusive channel, or may be described in the header part of each data to be provided.

Embodiment 10

FIG. 39 is a diagram illustrating a system structure of a broadcaster for realizing a data transmission method in accordance with a tenth embodiment. In the figure, the same reference numerals as in FIG. 34 denote identical or corresponding parts. Reference numeral 74 indicates an audience rate totaling unit totaling up an audience rate for each program.

The operation of the data transmission method of the tenth embodiment will be explained.

Just as in the ninth embodiment, a broadcaster comprising a broadcasting satellite and so on receives broadcast signals from sub-broadcasters each having one or plural channels, and after processing the received broadcast signals, transmits the processed broadcast signals to household receiving terminals. In this case, each of the sub-broadcasters transmits a library EPG data as information showing decoding software programs (libraries), necessary for decoding program signals transmitted by their own, arranged on a time axis for each channel.

The audience rate totaling unit 74 included in the broadcasting system of the broadcaster obtains and totals up information about an audience rate for each program from each broadcast station or an audience rate search company or the like. The library EPG analyzer 71 receives library EPG data transmitted by each sub-broadcaster, and, for example, and totals up the data in a way to arrange a list. Based on the list and the audience rate for each program totaled by the audience rate totaling unit 74, the library EPG analyzer 71 further produces, for each library, the number of programs using the library, and the distribution of audience rates gathering the audience rate of each program, at the time when the user actually needs the library, and, based on those, determines the transmission order and transmission incidence of libraries held in the library buffer 73.

Specifically, it is assumed that a necessary library and an audience rate of each channel at a certain time are as shown in FIG. 39. An audience rate of each channel at the same time in the previous day may be used in place of that at the certain time. Or the average of audience rates at the same time in a given period may be used. The library EPG analyzer 11 converts those audience rates into an audience rate distribution as shown in FIG. 40. That is, a library A is used in five programs, i.e., channel 1, 5, 7, 10, and 11, so the sum of an audience rate of each channel is 1+2+1+1+2=7. Similarly, for libraries B to D, the number of programs using the library and the total of audience rates are calculated. Afterwards, for each library, the number of programs using the library and the total of audience rates are multiplied by each other. The value of the multiplication is the transmission proportion of each library. For the transmission order, just as in the ninth embodiment, for example, libraries are distributed in the method shown in FIG. 36.

As described in the ninth embodiment, if there are many programs using a certain library, in general a program using the library is highly probably selected on the receiving side, that is, it is highly probably necessary for the library to be downloaded on the receiving side. Further, if a program has a high audience rate at the same time, the program is highly probably selected at the time, that is, it is highly probably necessary for the library to be downloaded on the receiving side. That is, when the number of programs using a library and the audience rate of each channel at the same time are taken into consideration, a value resulting from multiplying the number of programs actually broadcast, using the library, by the audience rate is thought to indicate how often the library is required to be downloaded. Therefore, if the number of each library provided is made proportional to the value resulting from multiplying the number of programs actually broadcast, using the library, by the audience rate, a library, which is highly probably required to be downloaded, is provided with a high incidence, so the download waiting time is effectively reduced on the receiving side.

As described above, according to the data transmission method of the tenth embodiment, the number of each library provided via a library exclusive channel is made proportional to a value resulting from multiplying the number of programs, actually broadcast, to be decoded using the library, by the audience rate. Therefore, a library, which is highly probably downloaded, is provided with a high incidence, so the download waiting time can be reduced on the receiving side.

What is claimed is:

1. A broadcasting reception apparatus receiving broadcast signals transmitted with a data broadcasting method of transmitting program signals of two or more kinds of broadcasting formats, and decoding software program, for decoding the program signals, via a plurality of channels, said apparatus comprising:

a library buffer for holding decoding software programs for decoding program signals;

a program obtaining unit for obtaining decoding software programs for decoding program signals from the broadcast signals, and storing the decoding software programs in said library buffer;

a checker for deciding whether said library buffer holds decoding software programs for decoding program signals being transmitted via each of said plurality of channels, or not, and for a channel for which said library buffer does not hold decoding software programs, predicting time which it takes to obtain the decoding software program by said program obtaining unit; and a channel display unit for presenting a display based on a result of the decision by said checker, the display making it possible to recognize whether said library buffer holds a decoding software program for decoding a program signal being transmitted via each channel, or not, and whether it takes a long or short time to obtain a decoding software program by said program obtaining unit, for a channel for which said library buffer does not hold the decoding software program.

2. The broadcasting reception apparatus of claim 1 wherein said checker predicts time which it takes to obtain a decoding software program by said program obtaining unit, based on the size of the decoding software program.

3. The broadcasting reception apparatus of claim 1 wherein said checker predicts time which it takes to obtain a decoding software program by said program obtaining unit, based on the size of the decoding software program and the incidence of the decoding software being provided by broadcasting.

4. The broadcasting reception apparatus of claim 1 wherein said channel display unit presents the channel display on an EPG display screen used for selecting receiving channels.

5. The broadcasting reception apparatus of claim 1 wherein said channel display unit presents the channel display on a portion of the display screen while said broadcasting reception apparatus displays a program on a display screen, or on a display unit set up apart from said broadcasting reception apparatus.

6. A broadcasting reception apparatus receiving broadcast signals transmitted with a data broadcasting method of transmitting program signals of two or more kinds of broadcasting formats, and decoding software programs for decoding the program signals, via a plurality of channels, said apparatus comprising:

a library buffer for holding decoding software programs for decoding program signals;

a download priority order determining unit for determining the order of priority of downloading decoding software programs, using a library EPG which is a list showing decoding software programs for decoding programs transmitted via the plurality of channels in a matrix of channel and time, wherein said download priority order determining unit counts up the number of programs decoded by each decoding software program from a present time to a predetermined time after using a library EPG, and determines the order of download priority according to a result of the counting; and a download unit for downloading decoding software programs by broadcasting, based on the order of download priority determined by said download priority order determining unit, and storing the decoding software programs in said library buffer.

7. The broadcasting reception apparatus of claim 6 further includes:

a library size detector for detecting the size of a decoding software program described in a library EPG; and an empty amount detector for detecting the empty amount of said library buffer, said download priority order determining unit determining the order of download priority, based on a result; off the counting and results of said library size detector and said empty amount detector.

8. A broadcasting reception apparatus receiving broadcast signals transmitted with a data broadcasting method of transmitting program signals of two or more kinds of broadcasting formats, and decoding software programs for decoding the program signals, via a plurality of channels, said apparatus comprising:

a library buffer for holding decoding software programs for decoding program signals;

a download priority order determining unit for determining the order of priority of downloading decoding software programs, using a library EPG which is a list showing decoding software programs for decoding programs transmitted via the plurality of channels in a matrix of channel and time, a download unit for downloading decoding software programs by broadcasting, based on the order of download priority determined by said download priority order determining unit, and storing the decoding software programs in said library buffer; and a past audience record holding unit for holding a past audience record of the user, said download priority order determining unit determining the order of download priority based on an audience tendency found from a library EPG and the past audience record.

9. The broadcasting reception apparatus of claim 8 wherein said download priority order determining unit uses the total audience time of channels listened or watched by the user, as the audience tendency.

10. The broadcasting reception apparatus of claim 8 wherein said download priority order determining unit uses the number of times of audience of channels listened or watched at the same time in the past, as the audience tendency.

11. A broadcasting reception apparatus receiving broadcast signals transmitted with a data broadcasting method of transmitting program signals of two or more kinds of broadcasting formats, and decoding software programs for decoding the program signals, via a plurality of channels, said apparatus comprising:

a library buffer for holding decoding software programs for decoding program signals;

a download priority order determining unit for determining the order of priority of downloading decoding software programs, using a library EPG which is a list showing decoding software programs for decoding programs transmitted via the plurality of channels in a matrix of channel and time, a download unit for downloading decoding software programs by broadcasting, based on the order of download priority determined by said download priority order determining unit, and storing the decoding software programs in said library buffer;

a genre-categorized program table holding unit for holding a genre-categorized program table in which the genre of each program is described; and a genre holding unit for holding the user's favorite genres, said download priority order determining unit determining the order of download priority based on a library EPG and programs of the genres found from the genre-categorized program table and the user's favorite genres.

12. A broadcasting reception apparatus receiving broadcast signals transmitted with a data broadcasting method of transmitting program signals of two or more kinds of broadcasting formats, and decoding software programs for decoding the program signals, via a plurality of channels, said apparatus comprising:

a library buffer for holding decoding software programs for decoding program signals;

a download priority order determining unit for determining the order of priority of downloading decoding software programs, using a library EPG which is a list showing decoding software programs for decoding programs transmitted via the plurality of channels in a matrix of channel and time;

a download unit for downloading decoding software programs by broadcasting, based on the order of download priority determined by said download priority order determining unit, and storing the decoding software programs in said library buffer; and a preset channel holding unit for holding a plurality of channels preset in a remote control with which the user selects channels, said download priority order determining unit determining the order of download priority based on a library EPG and the channels held in said preset channel holding unit.

13. A broadcasting reception apparatus receiving broadcast signals transmitted with a data broadcasting method of transmitting program signals of two or more kinds of broadcasting formats, and decoding software programs for decoding the program signals, via a plurality of channels, a plurality of cells corresponding to the plurality of channels being disposed in an m×n matrix (m and n are natural numbers) on an EPG picture, a receiving channel being selected by choosing one of the plurality of cells on the EPG picture, shifting a cursor from a cell to one of cells adjacent to the former cell by one operation of a remote control, said broadcasting reception apparatus comprising:

a library buffer for holding decoding software programs; and a program download unit for deciding whether decoding software programs for decoding programs transmitted via channels indicated on the EPG picture by a cell pointed by the cursor and its adjacent cells, are held in said library buffer, or not, and when the decoding software program is not held in said library buffer, downloading the decoding software program by broadcasting, and storing the decoding software program in said library buffer.

14. A broadcasting reception apparatus receiving broadcast signals transmitted with a data broadcasting method of transmitting program signals of two or more kinds of broadcasting formats, and decoding software programs for decoding the program signals, via a plurality of channels, a plurality of cells corresponding to the plurality of channels being disposed in an m×n matrix (m and n are natural numbers) on an EPG picture, a receiving channel being selected by choosing one of the plurality of cells on the EPG picture, shifting a cursor from a cell to one of cells adjacent to the former cell by one operation of a remote control, said broadcasting reception apparatus comprising:

a library buffer for holding decoding software programs; and a program download unit for deciding whether, assuming that a first cell is among the plurality of cells, the cursor shifts from the first cell to a second cell adjacent to the first cell, a third cell is among cells adjacent to the second cell, and positioned in the direction of the cursor shifting, and fourth and fifth cells are adjacent to both of the second and third cells, decoding software programs for decoding programs transmitted via channels indicated on the EPG picture by second, third, fourth, and fifth cells, are held in said library buffer, or not, and when the decoding software program is not held in said library buffer, downloading the decoding software program by broadcasting, and storing the decoding software program in said library buffer.

15. A broadcasting reception apparatus receiving broadcast signals transmitted with a data broadcasting method of transmitting program signals of two or more kinds of broadcasting formats, and decoding software programs for decoding the program signals, via a plurality of channels, a plurality of cells corresponding to the plurality of channels being disposed in an m×n matrix (m and n are natural numbers) on an EPG picture, a receiving channel being selected by choosing one of the plurality of cells on the EPG picture, shifting a cursor from a cell to one of cells adjacent to the, former cell by one operation of a remote control, said broadcasting reception apparatus comprising:

a display controller for controlling the display of an EPG picture in a way in which cells of the channels, via which program signals transmitted are decoded with the same decoding software program, are clustered together on the EPG picture.

16. A broadcasting reception apparatus receiving broadcast signals transmitted with a data broadcasting method of transmitting program signals of two or more kinds of broadcasting formats, and decoding software programs for decoding the program signals, via a plurality of channels, a plurality of cells corresponding to the plurality of channels being disposed in an m×n matrix (m and n are natural numbers) on an EPG picture, a receiving channel being selected by choosing one of the plurality of cells on the EPG picture, shifting a cursor from a cell to one of cells adjacent to the former cell by one operation of a remote control, said broadcasting reception apparatus comprising:

a display controller for controlling the display of an EPG picture in a way in which cells of the channels, via which program signals transmitted are decoded with decoding software programs stored in said library buffer, are clustered together on the EPG picture.

17. A broadcasting reception apparatus receiving broadcast signals transmitted with a data broadcasting method of transmitting program signals or two or more kinds of broadcasting formats, and decoding software programs for decoding the program signals, via a plurality of channels, a plurality of cells corresponding to the plurality of channels being recursively disposed in an m×n matrix (m and n are natural numbers) on an EPG picture displayed on a display screen, a remote control having input keys arranged in an m×n matrix, a receiving channel being selected by, after cells are continually selected one time less than the number of recurring times of cell arrangement until only a minimum unit of m×n matrix is shown on the EPG picture, choosing a cell of the minimum unit of m×n matrix on the EPG picture by choosing an input key on the corresponding position of the remote control, said broadcasting reception apparatus comprising:

a library buffer for holding decoding software programs;

a program download unit for deciding whether decoding software programs for decoding programs transmitted via channels indicated by cells on the minimum unit of m×n matrix after cells are continually selected one time less than the number of recurring times of cell arrangement, are held in said library buffer, or not, and when the decoding software program is not held in said library buffer, downloading the decoding software program by broadcasting, and storing the decoding software program in said library buffer.

18. A data broadcasting method of transmitting program signals of two or more kinds of broadcasting formats, and transmitting decoding software programs via a plurality of channels other than the former plurality of channels, said method comprising:

a first step for calculating the number of programs to be decoded by each decoding software program at a certain time, using library EPG data showing decoding software programs for decoding programs transmitted via the former plurality of channels, along the time axis; and a second step for providing the plurality of decoding software programs, the number of each decoding software program to be provided being determined according to the ratio of the number of programs calculated in said first step.

19. The data broadcasting method of claim 18 wherein the plurality of decoding software programs are distributedly provided, depending on the number of each decoding software program to be provided.

20. A data broadcasting method of transmitting program signals of two or more kinds of broadcasting formats, and transmitting decoding software programs via a plurality of channels other than the former plurality of channels, said method comprising:

a first step for calculating the number of programs to be decoded by each decoding software program at a certain time, using library EPG data showing decoding software programs for decoding programs transmitted via the former plurality of channels, along the time axis;

a second stop for calculating the total audience rates of respective programs to be decoded with each of the plurality of decoding software program; and a third step for providing the plurality of decoding software programs, the number of each decoding software program to be provided being determined according to the ratio of values resulting from multiplying the number of programs calculated in said first stop and the total audience rate calculated in said second step.

21. The data broadcasting method of claim 20 wherein the plurality of decoding of software programs are distributedly provided, depending on the number of each decoding software program to be provided.

* * * * *